(12) United States Patent
Iyer et al.

(10) Patent No.: US 9,888,513 B2
(45) Date of Patent: Feb. 6, 2018

(54) INTER-ENB CARRIER AGGREGATION

(71) Applicant: Nokia Solutions and Networks Oy, Espoo (FI)

(72) Inventors: Subramanian S. Iyer, Vernon Hills, IL (US); Mark Marsan, Elmhurst, IL (US); Kirk Ingemunson, Arlington Heights, IL (US); Apurv Mathur, Wheeling, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 13 days.

(21) Appl. No.: 14/733,262

(22) Filed: Jun. 8, 2015

(65) Prior Publication Data

US 2015/0359028 A1    Dec. 10, 2015

Related U.S. Application Data

(60) Provisional application No. 62/009,630, filed on Jun. 9, 2014.

(51) Int. Cl.
    *H04W 76/02*    (2009.01)
    *H04W 28/12*    (2009.01)
    (Continued)

(52) U.S. Cl.
    CPC ......... *H04W 76/025* (2013.01); *H04W 28/08* (2013.01); *H04W 28/12* (2013.01); *H04W 84/042* (2013.01)

(58) Field of Classification Search
    None
    See application file for complete search history.

(56) References Cited

U.S. PATENT DOCUMENTS

| 2014/0056243 A1* | 2/2014 | Pelletier | H04W 74/04 370/329 |
| 2015/0326456 A1* | 11/2015 | Dudda | H04L 43/062 370/252 |

FOREIGN PATENT DOCUMENTS

| WO | WO 2010/036154 A1 | 4/2010 |
| WO | WO 2012136256 A1 | 10/2012 |
| WO | WO 2013104416 A1 | 7/2013 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.8.0, Dec. 2013, 209 pgs.

(Continued)

*Primary Examiner* — Kouroush Mohebbi
(74) *Attorney, Agent, or Firm* — Harrington & Smith

(57) ABSTRACT

In a communication system where a primary cell is controlled by a first base station and a secondary cell is controlled by a second, different base station, flow control is performed between the primary cell and the secondary cell for data for a radio link control layer. According to the flow control, the data for the radio link control layer is communicated between the first and second base stations using a link between the first and second base stations. Flow control may be performed between the primary cell and the secondary cell by dynamically controlling a depth of queued radio link control data in the secondary cell for one or more UEs based on one or more factors, e.g., current/future loading of secondary cell, peak theoretical throughput for a UE in the secondary cell, and/or a UE's current channel quality information. Apparatus, methods, and computer program products are disclosed.

19 Claims, 13 Drawing Sheets

(51) Int. Cl.
 *H04W 28/08* (2009.01)
 *H04W 84/04* (2009.01)

(56) References Cited

OTHER PUBLICATIONS

"3rd Generation Partnership Project; Technical Specification Group Radio Access Network; Evolved Universal Terrestrial Radio Access (E-UTRA); Radio Link Control (RLC) protocol specification (Release 11)", 3GPP TS 36.322 V11.0.0, Sep. 2012, 39 pgs.

"3rd Generation Partnership Project; Technical Specification Group Radio Access Network; Study on Small Cell enhancements for E-UTRA and E-UTRAN; Higher layer aspects (Release 12)", 3GPP TR 36.842, V12.0.0, Dec. 2013, 70 pgs.

Ericsson: "PDCP reordering in dual connectivity"; 3GPP Draft; R2-141760; 3rd Generation Partnership Project (3GPP); Mobile Competence Centre; 650, Route des Lucioles; F-06921 Sophia-Antipolis Cedex; France; vol. RAN WG2, no. Valencia, Spain; Mar. 31, 2014-Apr. 4, 2014; Apr. 1, 2014 (Apr. 1, 2014); XP050792896; Retrieved from the Internet: URL:http://www.3gpp.org/ftp/Meetings_3GPP_SYNC/RAN2/Docs [retrieved on Apr. 1, 2014] sections 3.1, 3.2, 3.3.

"LTE—The UMTS Long Term Evolution—From theory to Practice", Stefania Sesia et al., ISBN 978-0-470-69716-0, John Wiley & Sons Ltd., 2009, 36 pgs.

\* cited by examiner

| D/C | CPT | ACK_SN | | | OCT 1 |
|---|---|---|---|---|---|
| ACK_SN | | | E1 | | OCT 2 |
| NACK_SN | | | | | OCT 3 |
| E1 | E2 | NACK_SN | | | OCT 4 |
| NACK_SN | | E1 | E2 | | OCT 5 |
| SOstart | | | | | OCT 6 |
| SOstart | | | SOend | | OCT 7 |
| SOend | | | | | OCT 8 |
| SOend | | NACK_SN | | | OCT 9 |

IN A COMMUNICATION SYSTEM WHERE A PRIMARY CELL IS CONTROLLED BY A FIRST BASE STATION AND A SECONDARY CELL IS CONTROLLED BY A SECOND, DIFFERENT BASE STATION, PERFORMING FLOW CONTROL BETWEEN THE PRIMARY CELL AND THE SECONDARY CELL FOR DATA FOR A RADIO LINK CONTROL LAYER —810

COMMUNICATING, ACCORDING TO THE FLOW CONTROL, THE DATA FOR THE RADIO LINK CONTROL LAYER BETWEEN THE FIRST AND SECOND BASE STATIONS USING A LINK BETWEEN THE FIRST AND SECOND BASE STATIONS —820

FIG.8

INTER-ENB CARRIER AGGREGATION

CROSS-REFERENCE TO RELATED APPLICATIONS

The present application claims the benefit under 35 U.S.C. § 119(e) of U.S. Provisional Patent Application No. 62/009,630, filed on Jun. 9, 2014, the disclosure of which is hereby incorporated by reference in its entirety.

TECHNICAL FIELD

This invention relates generally to wireless communications and, more specifically, to inter-eNB carrier aggregation, such as dual connectivity.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms used in this application or the drawings are defined below.

In 3GPP Rel-10 Carrier Aggregation (CA), two or more Component Carriers (CCs) are aggregated in order to support wider transmission bandwidths up to 100 MHz. A UE may simultaneously receive or transmit on one or multiple CCs, depending on its capabilities.

CA operation uses a number of serving cells, one for each CC. The Primary Serving Cell (PCell) is served by the Primary Component Carrier (PCC) and handles the Radio Resource Control (RRC) Connection with the UE. One or more Secondary Serving Cells (SCells) are served by the Secondary Component Carriers (SCCs) and provide the additional transmission bandwidth.

CA operation may be thought of as one aspect of dual connectivity. According to 3GPP TR 36.842 V12.0.0 (2013-12), Section 7.1, the term "dual connectivity" is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. See Section 7 of 3GPP TR 36.842 for additional description regarding dual connectivity.

The Rel-10 3GPP specification supports CA operation only in a scenario where the PCell and SCell(s) are co-located in the same eNB. It would be beneficial to improve on this scenario.

BRIEF SUMMARY

This section is intended to include examples and is not intended to be limiting.

In an exemplary embodiment, a method is disclosed that includes: performing, in a communication system where a primary cell is controlled by a first base station and a secondary cell is controlled by a second, different base station, flow control between the primary cell and the secondary cell for data for a radio link control layer; and communicating, according to the flow control, the data for the radio link control layer between the first and second base stations using a link between the first and second base stations.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: performing, in a communication system where a primary cell is controlled by a first base station and a secondary cell is controlled by a second, different base station, flow control between the primary cell and the secondary cell for data for a radio link control layer; and communicating, according to the flow control, the data for the radio link control layer between the first and second base stations using a link between the first and second base stations.

An exemplary computer program product includes a computer-readable storage medium bearing computer program code embodied therein for use with a computer. The computer program code includes: code for performing, in a communication system where a primary cell is controlled by a first base station and a secondary cell is controlled by a second, different base station, flow control between the primary cell and the secondary cell for data for a radio link control layer; and code for communicating, according to the flow control, the data for the radio link control layer between the first and second base stations using a link between the first and second base stations.

A further exemplary embodiment is an apparatus comprising: means for performing, in a communication system where a primary cell is controlled by a first base station and a secondary cell is controlled by a second, different base station, flow control between the primary cell and the secondary cell for data for a radio link control layer; and means for communicating, according to the flow control, the data for the radio link control layer between the first and second base stations using a link between the first and second base stations.

In a further exemplary embodiment, flow control may be performed between the primary cell and the secondary cell by, e.g., dynamically controlling a depth of queued radio link control data in the secondary cell for one or more user equipment based on one or more factors.

Additionally, the one or more factors may comprise one of the following or multiples ones of the following in combination: current loading of the secondary cell; projected future loading of the secondary cell; peak theoretical throughput for a user equipment in the secondary cell; a user equipment's current channel quality information; or an amount of data currently queued for a user equipment. For instance, the one or more factors may comprise one or both of current loading of the secondary cell or projected future loading of the secondary cell. As other examples, a combination of a user equipment's current channel quality information and current loading of the secondary cell may be used, as may any other possible combination of the factors.

BRIEF DESCRIPTION OF THE DRAWINGS

In the attached Drawing Figures:

FIG. 7 is an example of an RLC STATUS PDU;

FIG. 8 is a block diagram of an exemplary logic flow diagram for inter-eNB carrier aggregation, and that illustrates the operation of an exemplary method, a result of execution of computer program instructions embodied on a computer readable memory, and/or functions performed by logic implemented in hardware, in accordance with exemplary embodiments herein.

DETAILED DESCRIPTION OF THE DRAWINGS

Figure 1:
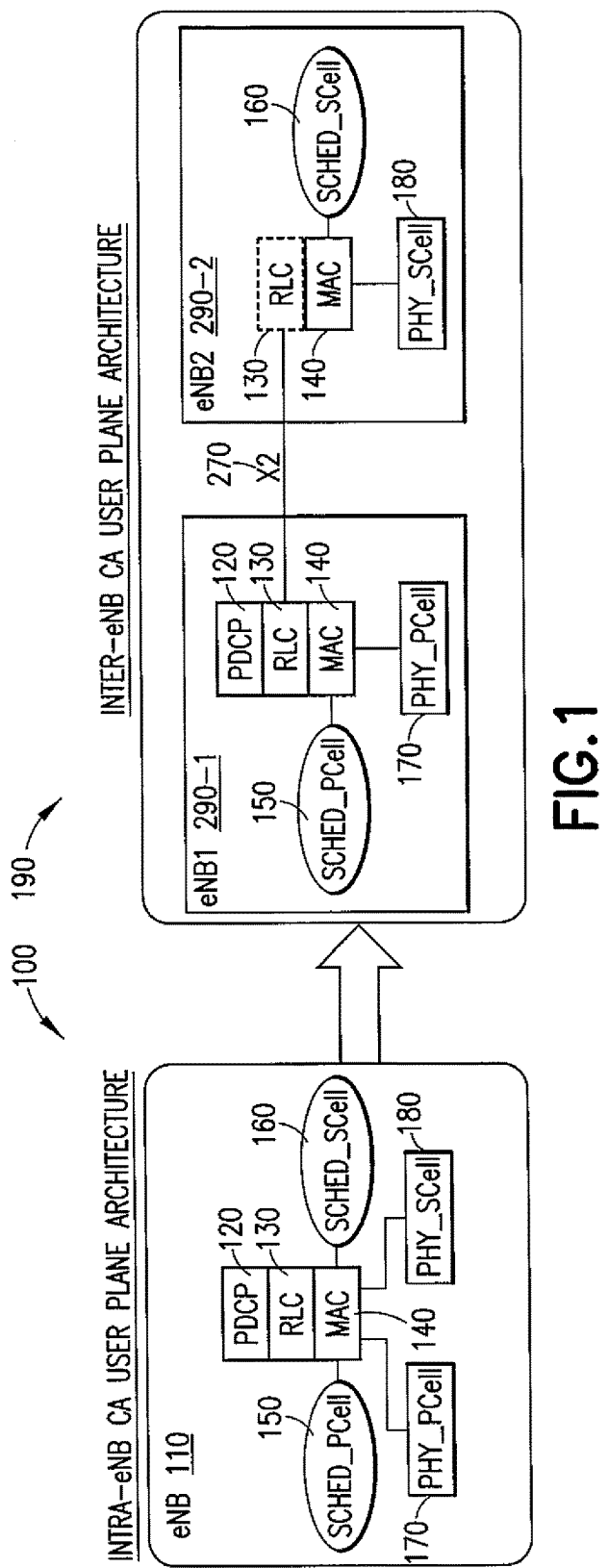
FIG. 1 shows changes between intra-eNB and inter-eNB user plane architecture.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, it is beneficial to improve on the Rel-10 3GPP specification, which supports CA operation only in a scenario where the PCell and SCell(s) are co-located in the same eNB. Exemplary embodiments herein propose a CA operation solution where the PCell and SCell(s) can be located in different eNBs. Before proceeding with additional description of the exemplary embodiments, additional detail regarding conventional techniques is presented.

For CA operation, the eNB and the UE use a single Layer 2 (L2) protocol stack (including the PDCP/RLC/MAC layers). Independent schedulers and PHY layers are used on the PCell and SCells. For DL, these schedulers at each serving cell of the eNB schedule the Transport Blocks (TBs) constructed from the common pool of RLC SDUs and transmit them to the UE via PHY (the physical layer). Thus, the multi-carrier nature of PHY is only exposed to the MAC and PHY layers.

An RLC PDU, for construction of a TB of a certain size, is formed by the RLC layer only when notified by the MAC layer of a transmission opportunity. The TB size and hence the corresponding RLC PDU size is determined by the scheduler based on the current CQI information from the UE. As the RLC PDU size is based on the current radio conditions (e.g., CQI) experienced by the UE and the RLC SDUs are used by all the cells from a common pool, the RLC/MAC layers used to construct the RLC PDU/TB are shared and co-located to meet the stringent timing requirements involved in scheduling a TB and transmitting the TB to the UE. Thus, the SCell(s) are co-located with the PCell for the intra-eNB CA architecture with a single L2 stack. With inter-eNB CA operation (where "inter-eNB CA operation" means the PCell is located in one eNB and a SCell is located in another eNB), if the single L2 protocol stack at the eNB is to be kept, the L2 stack will be kept at the eNB hosting the PCell and the SCell scheduler at the remote eNB must request the PCell for a TB of a certain size every TTI over the X2 link connecting the two eNBs. The PCell L2 will then construct the TB and send the TB over the X2 link to SCell, which will then transmit the TB through the SCell PHY layer. Thus the scheduling of a TB will experience an additional delay of twice the X2 link latency due to sending the TB request and getting the TB over the link This delay will cause scheduler stalling as described below. ARQ retransmissions will also experience this delay.

In addition, there is one independent HARQ entity per serving cell. HARQ ACKs/NACKs corresponding to a TB are handled by the respective serving cell that transmitted the TB and HARQ re-transmissions are also performed by that cell. However, PUCCH/PUSCH that is used to carry the HARQ ACK/NACKs is transmitted only on the PCell. Thus, the HARQ ACK/NACKs for TBs transmitted by PCell and the SCell(s) are received by the PCell and forwarded to the SCell(s). With intra-eNB CA, this is not an issue as the PCell and SCell(s) are co-located. With inter-eNB CA, the HARQ ACK/NACKs will arrive at the SCell(s) with a delay that is equal to the X2 latency between the eNBs hosting the PCell and SCell(s) respectively.

This delayed reception of HARQ ACK/NACKs at the SCell(s) results in two potential issues. One is that the HARQ re-transmission is delayed due to the late NACK. However, as eNB HARQ re-transmission is asynchronous, this is not an issue provided that the delay is not so large that the delay will impact the MCS coding rate for re-transmission. The second issue is that there are a fixed number of DL HARQ stop-and-wait processes. The maximum number of outstanding TBs for which a HARQ ACK/NACK is awaited by the SCell is equal to this number of DL HARQ processes. Based on the delay value, the scheduler can stall from scheduling the next TB, as the scheduler is waiting for a HARQ ACK/NACK. A large X2 delay can stall the SCell scheduler heavily, thus reducing the high throughput benefit that CA brings. If TBs are obtained through requests across the X2 link from the PCell, the resultant delay for the scheduler from pre-scheduler start to reception of HARQ ACK/NACK is three times the X2 delay: one X2 delay for TB request across X2, a second X2 delay for TB reception across X2 and a third X2 delay for HARQ ACK/NACK across X2.

In summary, first, the single L2 stack architecture defined in specifications for CA supports only intra-eNB CA and this architecture results in scheduler delays due to SCell requesting and receiving TBs from the PCell over the X2 link. Second, presence of PUCCH/PUSCH in PCell only causes HARQ ACK/NACKs to be delivered with a delay to remotely located SCell(s). Both of these delays contribute to scheduler stalling. The L2 architecture may be changed to avoid the SCell requesting and receiving TBs from the PCell over the X2 link and the X2 delay may be minimized for supporting inter-eNB CA with effective SCell throughput.

As an overview, the exemplary embodiments of the invention may include one or more of the following.

1) The following are exemplary L2 architectural changes to reduce HARQ stalling. The SCell requesting and receiving RLC PDUs (e.g., AMD PDUs) from PCell at the time of pre-scheduling should be avoided to eliminate the scheduler delay of twice the X2 latency. Send RLC PDUs (e.g., AMD PDUs) with assigned RLC sequence numbers (SNs) from PCell to SCell(s), the frequency of which is controlled with flow control between PCell and SCell. SCell re-segments the PDUs into PDU segments or concatenates PDUs based on the TB size determined by the SCell scheduler at the scheduling time, and the TBs are transmitted by SCell PHY to the UE.

2) Flow control is performed between PCell and SCell. Either SCell or PCell will dynamically manage the depth of the queued RLC data in the SCell for each UE, using one or more of the following factors:

The current loading of the cell (e.g., the amount of buffered data for all UEs, and/or percent of RBs committed to GBR flows).

The peak theoretical throughput for this UE in the SCell, which is derived from the current one-way delay between PCell/SCell. This delay may cause throughput stalls due to the limited number of HARQ channels available and the PCell/SCell message latency.

The UE's current CQI, which will constrain the amount of data the UE can receive.

The amount of data currently queued for the UE.

3) The PDUs (e.g., AMD PDUs) will be sent over the X2 link using an unreliable protocol such as GTP-U protocol. It should be noted that 3GPP TS 36.222 V.11.0.0 (2012-09) forms part of this disclosure, such that the disclosure of which is hereby incorporated by reference in its entirety. 3GPP TS 36.222 contains information about PDUs, including STATUS PDUs (as shown in FIG. 7 herein). As a protocol such as the GTP-U protocol is unreliable, some PDUs maybe lost over the link. The PCell will send SCell the ARQ ACK/NACKs in the STATUS PDU for only those AMD PDUs which were sent to the SCell for transmission. If the SCell received an ARQ NACK for an AMD PDU which was not received by the SCell, the SCell will inform the PCell so that PCell can re-transmit that AMD PDU by itself. Alternately, the SCell will send to PCell the list of AMD PDUs transmitted successfully. PCell will use this list and the STATUS PDU to determine the list of PDUs that were lost over the link.

4) When SCell is deactivated for a UE, the SCell will simply discard any queued RLC data for that UE instead of transferring the data back to the PCell. It will be the responsibility of the PCell to monitor the STATUS PDU for RLC ACKs and guarantee delivery of data.

Now that the exemplary overview has been described, the exemplary embodiments are described in additional detail. For ease of reference, the rest of this disclosure is divided into sections.

Section 1. Suggested Architecture Change to Reduce HARQ Stalling

In CA, a single user plane protocol stack is used by the eNB and UE. In intra-eNB CA where the SCell and PCell are co-located, the common pool of RLC SDUs is used by both cells to schedule and transmit TBs independently to the UE. With inter-eNB CA, as the PCell and SCell are remotely located, without an L2 architectural change, a scheduler delay of twice the X2 latency will result due to SCell requesting and receiving RLC PDUs (AMD PDUs only) from PCell at the time of pre-scheduling. This delay may be avoided for achieving effective SCell throughput by reducing scheduler stalling. FIG. 1 shows the L2 architecture changes that are suggested to be made in an exemplary embodiment.

Turning to FIG. 1, this figure shows changes between intra-eNB and inter-eNB user plane architecture. Reference 100 shows an intra-eNB user plane architecture for an eNB 110, where the eNB 110 implements both the PCell and the SCell. The eNB 110 has both the PCell and SCell, as well as corresponding physical (L1) layers PHY_PCell 170 and PHY_SCell 180. The eNB 110 also has corresponding PCell and SCell schedulers SCHED_PCell 150 and SCHED_SCell 160, respectively. The L2 layer comprises the PDCP layer 120, RLC layer 130, and MAC layer 140. Reference 190 shows a suggested inter-eNB CA user plane architecture. The eNB 290-1 controls the PCell and the corresponding physical layer PHY_PCell 170, along with the L2 layers PDCP layer 120, RLC layer 130, and MAC layer 140. The eNB 290-1 implements the PCell scheduler SCHED_PCell 150. The eNB 290-1 communicates with the eNB 290-2 via a link 270, which implements an X2 interface in this example. The eNB 290-2 controls the SCell and the corresponding physical layer PHY_SCell 180, along with the L2 layers RLC layer 130, and MAC layer 140. The eNB 290-2 implements the SCell scheduler SCHED_SCell 160.

Figure 2:
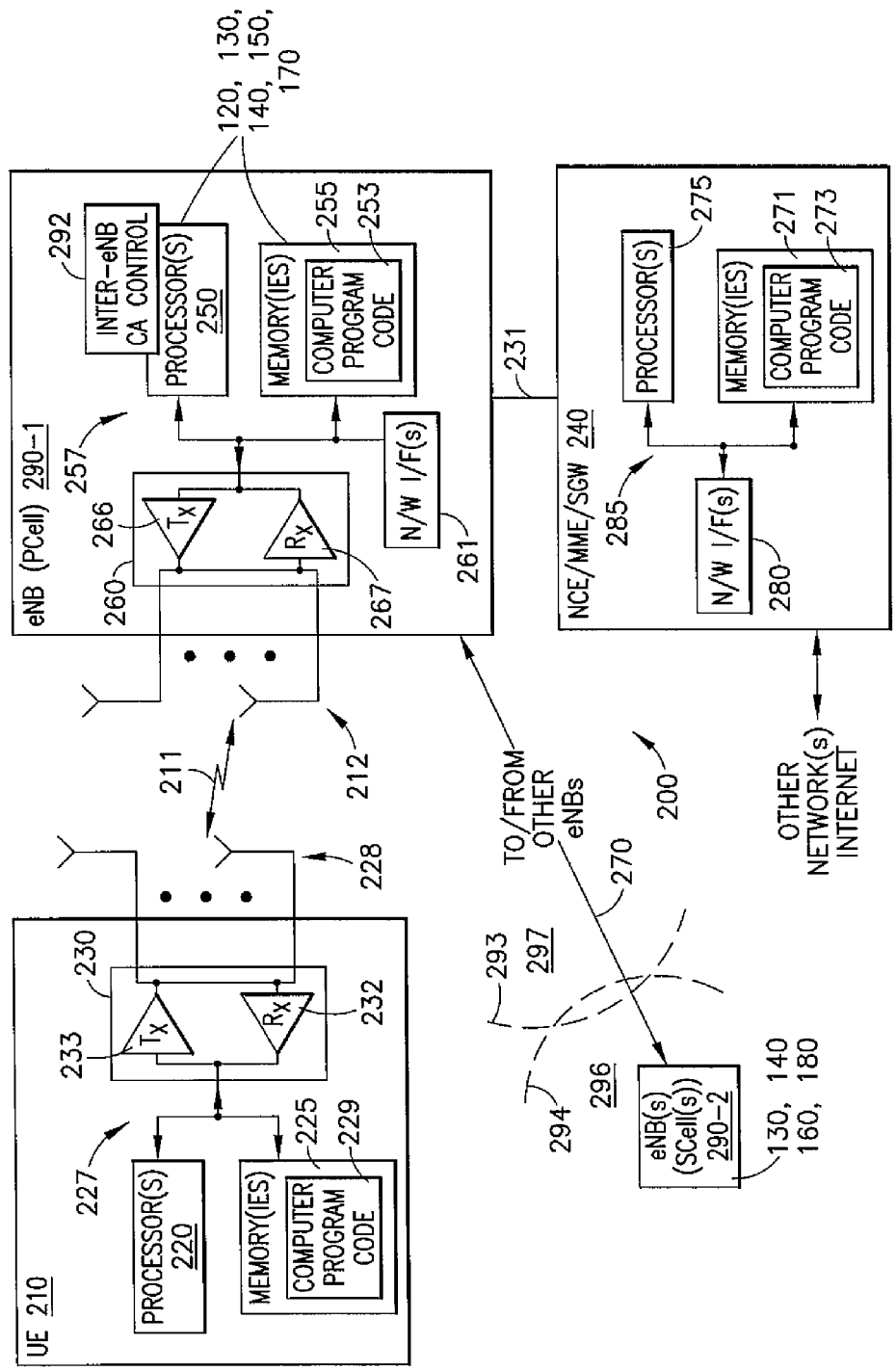
FIG. 2 illustrates a block diagram of an exemplary system in which the exemplary embodiments may be practiced.

Reference is made to FIG. 2, which shows a block diagram of an exemplary system in which the exemplary embodiments may be practiced. In FIG. 2, user equipment (UE) 210 is in wireless communication with a network 200 via a wireless link 211. The user equipment 210 includes one or more processors 220, one or more memories 225, and one or more transceivers 230 (each comprising a receiver, Rx, 232, and a transmitter, Tx, 233), interconnected through one or more buses 227. The one or more transceivers 230 are connected to one or more antennas 228. The one or more memories 225 include computer program code 229.

The eNB 290-1, which is a base station providing wireless access by the UE 210 to the network 200, includes one or more processors 250, one or more memories 255, one or more network interfaces (N/W I/F(s)) 261, and one or more transceivers 260 (each comprising a receiver, Rx, 267 and a transmitter, Tx, 266) interconnected through one or more buses 257. The eNB 290-1 controls the PCell. The one or more transceivers 260 are connected to an antenna or antenna array 212. The one or more memories 255 include computer program code 253. In this example, there is an inter-eNB CA control module 292 that is part of the eNB 290-1 and that causes the eNB 290-1 to perform one or more of the operations herein. In an example, the inter-eNB CA control module 292 is formed (e.g., completely or in part) using the computer program code 253. That is, the computer program code 253 in the one or more memories 255 in an example may operate to control the eNB 290, such that the one or more memories 255 and the computer program code 253 are configured, with the one or more processors 250, to cause the eNB 290-1 to perform one or more of the techniques described herein. In another example, the inter-eNB CA control module 292 may be implemented (e.g., completely or in part) in hardware elements, such as an application-specific integrated circuit, or a field-programmable gate array. As with the inter-eNB CA control module 292, the PDCP layer 120, RLC layer 130, MAC layer 140, PCell scheduler SCHED_PCell 150, and physical layer PHY_PCell 170 can be implemented as computer program code 253 or hardware or both.

The eNB 290-2 controls the SCell and is assumed to be similar to the eNB 290-1 in terms of the internal elements. However, the eNB 290-2 includes the RLC layer 130, MAC layer 140, SCell scheduler SCHED_SCell 160, and the physical layer PHY_SCell 180.

The eNB 290-1 forms one or more cells 297, an edge of which is illustrated in FIG. 2 as reference 293. The eNB 290-2 forms one or more cells 296, an edge of which is illustrated in FIG. 2 as reference 294. For ease of reference and clarity herein, the eNB 290-1 will be referred to primarily as the PCell eNB 290-1 or the PCell, and the eNB 290-2 will be referred to primarily as the SCell eNB 290-2 or SCell. Note that there could be multiple SCell(s) eNB(s) 290-2.

The one or more network interfaces 261 communicate over one or more networks such as the links 270 and 231. Two or more eNBs 290 communicate using, e.g., link 270. The link 270 may be wired or wireless or both and may implement, e.g., an X2 interface.

The wireless network 200 may include a network control element (NCE) 240 that may include Mobility Management Entity (MME) or Serving GateWay (SGW) functionality, and which provides connectivity with a further network, such as a telephone network and/or a data communications network (e.g., the Internet). The eNB 290 is coupled via a link 231 to the NCE 240. The link 231 may be implemented as, e.g., an SI interface. The link 231 may also connect to the SCell eNB 290-2. The NCE 240 includes one or more processors 275, one or more memories 271, and one or more network interfaces (N/W I/F(s)) 280, interconnected through one or more buses 285. The one or more memories 271 include computer program code 273.

The computer readable memories 225, 255, and 271 may be of any type suitable to the local technical environment and may be implemented using any suitable data storage technology, such as semiconductor based memory devices, flash memory, magnetic memory devices and systems, optical memory devices and systems, fixed memory and removable memory. The processors 220, 250, and 275 may be of any type suitable to the local technical environment, and may include one or more of general purpose computers, special purpose computers, microprocessors, digital signal processors (DSPs) and processors based on a multi-core processor architecture, as non-limiting examples.

With reference to both FIGS. 1 and 2, with inter-eNB CA, PCell eNB 290-1 will construct RLC (AMD) PDUs of a certain size from the RLC SDUs and send them to the SCell(s) eNB 290-2, for example, via an X2 interface over link 270. GTP/UDP/IP protocol will typically be used to carry the AMD PDUs. A proxy RLC layer 130 in the SCell will handle the AMD PDUs received from the PCell.

The AMD PDUs are generated by the PCell, with the RLC sequence number allocated. There may be only one L2 protocol stack (not shown) at the UE and only one RLC entity at the eNB(s) may generate the sequence numbers.

As the TB size for transmission is determined by the scheduler based on the current UE CQI information, the AMD PDU received by the SCell may not be transmitted as one TB. SCell may re-segment the AMD PDU into AMD PDU segments based on the TB size determined by the SCell scheduler at the scheduling time, and the TBs are transmitted by SCell PHY to the UE. If an AMD PDU is segmented, all AMD PDU segments may carry the same RLC sequence number generated by the PCell.

If the TB size determined by the scheduler is larger than the next AMD PDU or AMD PDU segment to be transmitted, SCell may concatenate one or more AMD PDUs or AMD PDU segments that will fit the TB size. Thus, the various combinations of data units that may be concatenated are:

One AMD PDU segment and one or more AMD PDUs;
One AMD PDU segment and one or more AMD PDUs and one more AMD PDU segment at the end;
Two AMD PDU segments;
Two or more AMD PDUs; or
Two or more AMD PDUs and one AMD PDU segment at the end.

In an exemplary embodiment, only AMD traffic is supported. The reason for this limitation is that only AMD PDUs can be re-segmented. As RLC PDUs have to be re-segmented to get a TB of a size determined by the scheduler, only AMD traffic can be supported. As most non-GBR services use acknowledged mode, this limitation should be acceptable.

The proxy RLC layer (i.e., RLC layer 130 in the SCell) will buffer the AMD PDU and the constructed AMD PDU segments for the purpose of HARQ retransmissions and ARQ retransmissions.

Section 2. Flow Control between SCell and PCell

In response to SCell activation, the SCell sends an initial message (e.g., AMD_PDU_DATA_REQUEST) to the PCell to deliver RLC PDUs. This message will specify the size of RLC PDU to send (RLC PDU can be any size) and the number of PDUs to send. Since the PCell-SCell delay may not be known at this time, some default values may be used. The intent is for the PCell to "prime the pump" with sufficient data for the SCell to schedule the UE while the PCell is measuring the PCell-SCell delay and gathering data to manage flow control.

The RLC PDU size and the number of PDUs could also be determined by setting a target buffering delay T at the SeNB. Thus, if T is to be limited to say 10 ms, it is possible to compute the amount of data that can be transmitted by the SCell by using the formula below and using a conservative CQI such as QPSK, and assuming a conservative percentage of resource block space that may be allocated to the UE based on the current loading factor in the SCell. Note that SCell CQI information is not sent by the UE until after the SCell activation, so CQI information will not be available. Even if the initial request is small, once the SCell transmission begins and flow control runs, larger requests can be made based on the drain rate and target buffering delay. An example calculation is presented later.

The PCell will respond with a series of messages (e.g., AMD_PDU_DATA_RESPONSE message(s)) containing the requested RLC PDUs. When the first message is received, the SCell will calculate the time lag between the original PDU request and this message. This will be used as a seed value for the RTT delay between SCell and PCell. Subsequently, each time the SCell initiates a procedure to the PCell and awaits a response, the SCell can use the measured delay as a new input into the delay measurement algorithm. This delay can be dynamically estimated over time via a simple weighting algorithm such as RTT= ($\alpha$·Old_RTT)+((1−$\alpha$)New_Round_Trip_Sample), where $\alpha$ is a weight. The weight $\alpha$ could be, for instance, 0.9. If there is a high variance in the RTT, it is beneficial to use a larger value. If the variance is low, Old_RTT would be close to New_Round_Trip_Sample. Timestamps from the PCell could also be sent along with SCell Addition/Activation Requests and SCell could compare the timestamps against the SCell timestamp on reception of the control messages to determine the initial one-way time delay on the X2 link 270.

Once the SCell has data queued for the UE, the SCell will be able to consider this UE for DL scheduling. At the completion of its DL scheduling algorithm (e.g., by the scheduler 160) each TTI, the SCell will estimate the approximate length of time that the UE's queued RLC data will last. An example proposed formula is as follows:

$$t_{drain} = \frac{\beta * BufLen}{MaxRBs * BitsPerRB},$$

where $$MaxRBs = TotalRBs * \min((1 - L_f), (MaxRBsforUE)),$$

It is noted that MaxRBs is really MaxRBs per subframe or MaxRBs per milliseconds (ms), and where:

$\beta$=coefficient set to value<1 to account for conditions when the UE's throughput could be improving (e.g., cell loading decreasing or CQI increasing). This factor is mainly used so that the data to be obtained from PCell is not under-estimated;

BufLen=amount of RLC data queued for the UE in bits;

BitsPerRB=the number of bits per RB that the UE would be scheduled, based on its latest reported CQI value for this carrier;

TotalRBs=the total number of DL resource blocks in this carrier (e.g., 100 RBs per subframe for 20 MHz carrier);

$L_f$=a projected future loading level for this carrier, based on the total amount of data queued for other UEs and the percentage of RBs already reserved for GBR flows. See more details on this below; and MaxRBsforUE=maximum theoretical percentage of RBs that the UE could be assigned as a rolling average in this carrier, based on the duplexing (FDD versus TDD), TDD frame configuration, and the current PCell-SCell delay for the UE. Due to the limited number of HARQ channels, the inter-eNB delay will result in throughput stalls. Those stalls will increase along with the inter-eNB latency. The calculation for this theoretical percentage is presented later.

Next, the SCell scheduler will compare this calculated duration (i.e., $t_{drain}$) to a threshold value that is a certain margin ($T_{margin}$) greater than the latest estimated RTT delay. If the duration is less than or equal to $T_{margin}$, SCell may request additional data from the PCell. $T_{margin}$ will ensure that there is more data queued in SCell than what will be drained while more data is fetched from PCell, in case the delay is more than the estimated RTT.

The amount of data requested may depend on the target buffering delay T to be met. Let the link latency be $T_{x2}$, e.g., RTT/2. Assuming the same drain rate for the requested data, the amount of data requested ($D_{request}$) in bits is given by:

$$D_{request}=(BufLen/t_{drain})*(T+2*T_{x2}-t_{drain}).$$

Knowing the amount of data to be requested, the request can be specified in terms of AMD PDU size and number of PDUs. AMD PDUs can be any size. Considering the wide possible range of UE throughputs in the SCell, it is difficult to define a single one-size-fits-all PDU size. If the UE 210 is receiving maximum throughput in the SCell, then a too-small PDU size would result in an unnecessarily large number of RLC PDUs; at the other end of the spectrum, if the UE 210 is at cell edge 294 and receiving low throughput in the SCell, a too-large RLC PDU may require many segments and may take a very long time to transmit.

A more flexible approach would be to adaptively size the RLC PDU in proportion to the UE's current SCell throughput level. For example, one could size the RLC PDU to match the UE's average throughput per TTI. For instance, if the UE is receiving 10 Mbps in the SCell, the RLC PDU could be sized at 10 Mbps/(1000 subframes/second)/(8 bits/byte)=1250 bytes. If the UE was receiving ten times higher throughput (100 Mbps), its RLC PDU would be sized at 12500 bytes.

Note that even though SCell may request N PDUs, PCell may send less based on its scheduling decisions which may be based on its own loading factor, amount of data queued for the UE, and the like.

Section 2.1. Projected Loading Level for the Carrier ($L_f$)

The projected loading level for the carrier is determined by aggregating the individual percentage of RBs that will be used by each active UE (non-CA UEs as well as CA UEs) based on the amount of its queued non-GBR data as well as the percentage of RBs that will be used by the GBR traffic for the UEs. The idea is to estimate this loading level over a next set of subframes in which all the active UEs in the SCell are scheduled once.

Thus, $L_f$ the average future loading level over a set of subframes. If one assumes $L_f$ is the average combined loading level of all UEs except $UE_x$, then (1−$L_f$) would represent the percentage of RBs available for $UE_x$, on the average.

Another possibility is to apply weights to both the previous loading level and the computed future loading level. Thus, $$L_f=(\alpha \cdot L_{f\_old})+((1-\alpha) \cdot L_{f\_new}), \text{ where } \alpha \text{ is a weight.}$$

The weight $\alpha$ could be, for instance, 0.9. The loading factor could have a high variance, particularly with bursty traffic, so it is beneficial to use a high value for the weight.

In addition, the scheduling weight related to scheduling a CA UE could be set to a high value so that the probability of a CA UE being served in a TTI is increased. As SCell traffic experiences delay across the X2 link, this weight may be set to a value to provide for a greater probability of the SCell traffic being served. Thus, for calculation of $L_f$, it can be assumed that CA UEs being served by the SCell will have a greater probability of being scheduled through appropriate setting of this weight.

Section 2.2. Maximum Theoretical Percentage of RBs for a UE (MaxRBsForUE)

Section 2.2.1. FDD-FDD

As mentioned, presence of PUCCH/PUSCH in PCell only necessitates PCell to forward the HARQ ACK/NACKs and RLC STATUS PDUs to remotely located SCell(s). Thus, HARQ ACK/NACKs will be delivered to the SCell(s) with a delay equal to the link (e.g. X2) latency.

Figure 3:
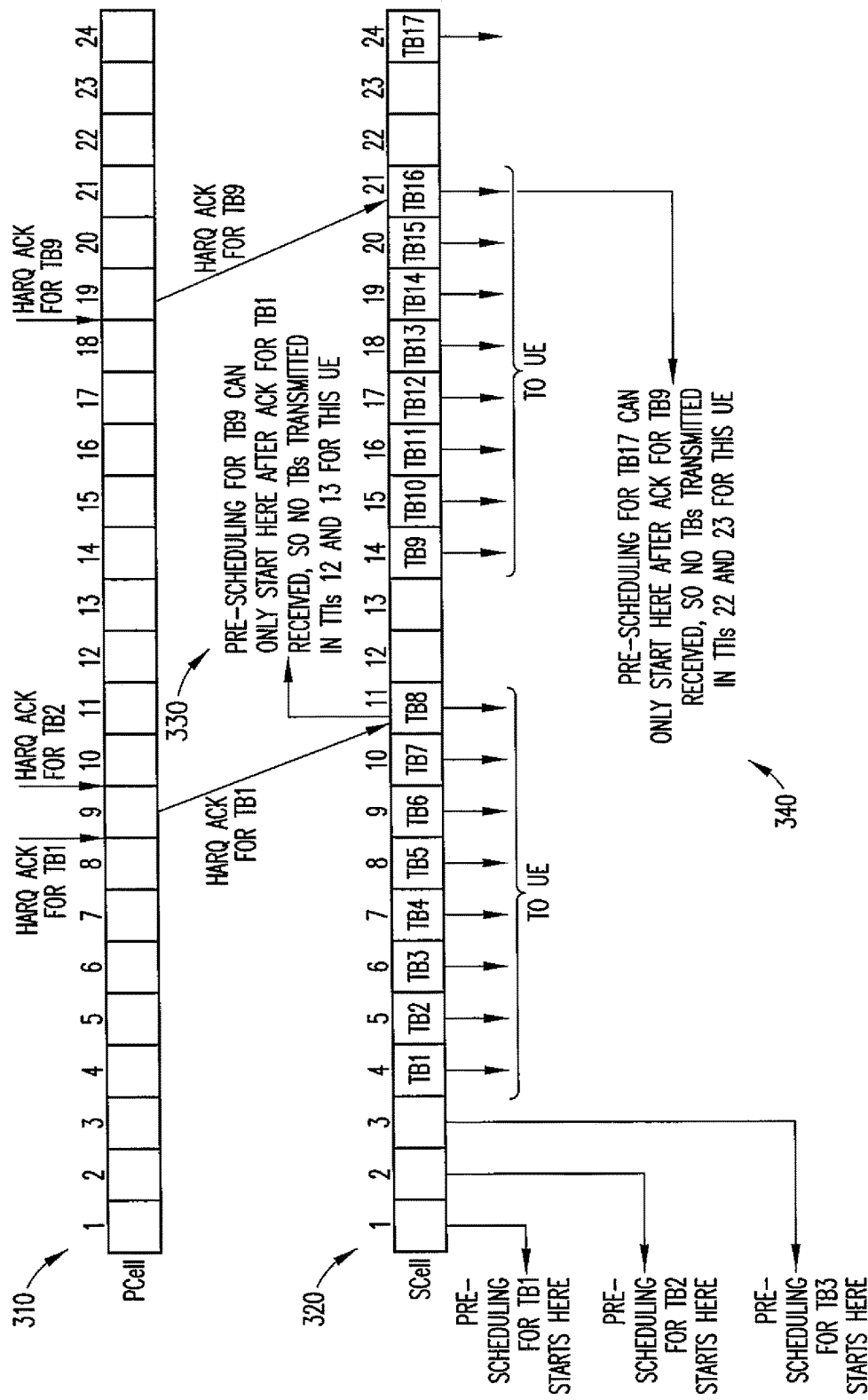
FIG. 3 shows a scenario for inter-eNB CA SCell DL Data Transmission for FDD-FDD (PCell and SCell are both FDD), showing inter-eNB CA SCell DL data transmission (FDD, 8 DL HARQ Processes, $T_{x2}$=2 ms) with 2 of 10 TTIs unused.

FIG. 3 shows a scenario for inter-eNB CA SCell DL data transmission for FDD-FDD (PCell and SCell are both FDD). For FDD, there are eight HARQ processes for DL. Pre-scheduling for a TB starts about three TTIs 320 (for SCell, where TTIs 310 are also shown for PCell) (each TTI is one millisecond in duration) prior to PHY transmission of the TB. As there are eight HARQ processes, a maximum of eight TBs can be sent after which a HARQ ACK must be received before the ninth TB can be pre-scheduled.

In a FIG. 3 scenario, X2 latency ($T_{x2}$) of two milliseconds is used. For TB1 transmitted at TTI 4, the UE sends the HARQ ACK to PCell in TTI 8 which is forwarded by PCell in TTI 9 after decoding. The HARQ ACK is received by the SCell at TTI 11 due to the two ms $T_{x2}$. As pre-scheduling (see reference 330) for TB9 can start only after receiving HARQ ACK for TB1, TB9 can be transmitted in TTI 14 only and hence TTIs 12 and 13 cannot be used for DL transmission for this UE. Similarly, for TB9 transmitted at TTI 14, the UE sends the HARQ ACK to PCell in TTI 19 which is forwarded by PCell in TTI 19 after decoding. The HARQ ACK is received by the SCell at TTI 21 due to the two ms $T_{x2}$. As pre-scheduling (see reference 340) for TB17 can start only after receiving HARQ ACK for TB9, TB17 can be transmitted in TTI 24 only and hence TTIs 22 and 23 cannot be used for DL transmission for this UE.

For the same UE, this pattern repeats where DL data can be transmitted to the UE for eight TTIs followed by two TTIs of no transmission and then another eight TTIs of data transmission. Thus, for two ms $T_{x2}$, UE can receive data for eight out of every ten TTIs, thus leading to a throughput efficiency of 80 percent. Consequently, the throughput efficiency is $(100*8)/(T_{x2}+8)$ percent.

The MaxRBsForUE is same as the throughput efficiency. The values of MaxRBsForUE, expressed as a fraction, for different values of $T_{x2}$ are given below in Table 1, which illustrates the MaxRBsForUE, which is a maximum theoretical percentage of RBs for a UE (FDD).

| | $T_{x2}$ (ms) | | | |
|---|---|---|---|---|
| | 1 | 2 | 3 | 4 |
| MaxRBsForUE | 0.89 | 0.80 | 0.73 | 0.67 |

Section 2.2.2. TDD-TDD Frame Configuration 1

Figure 4A:
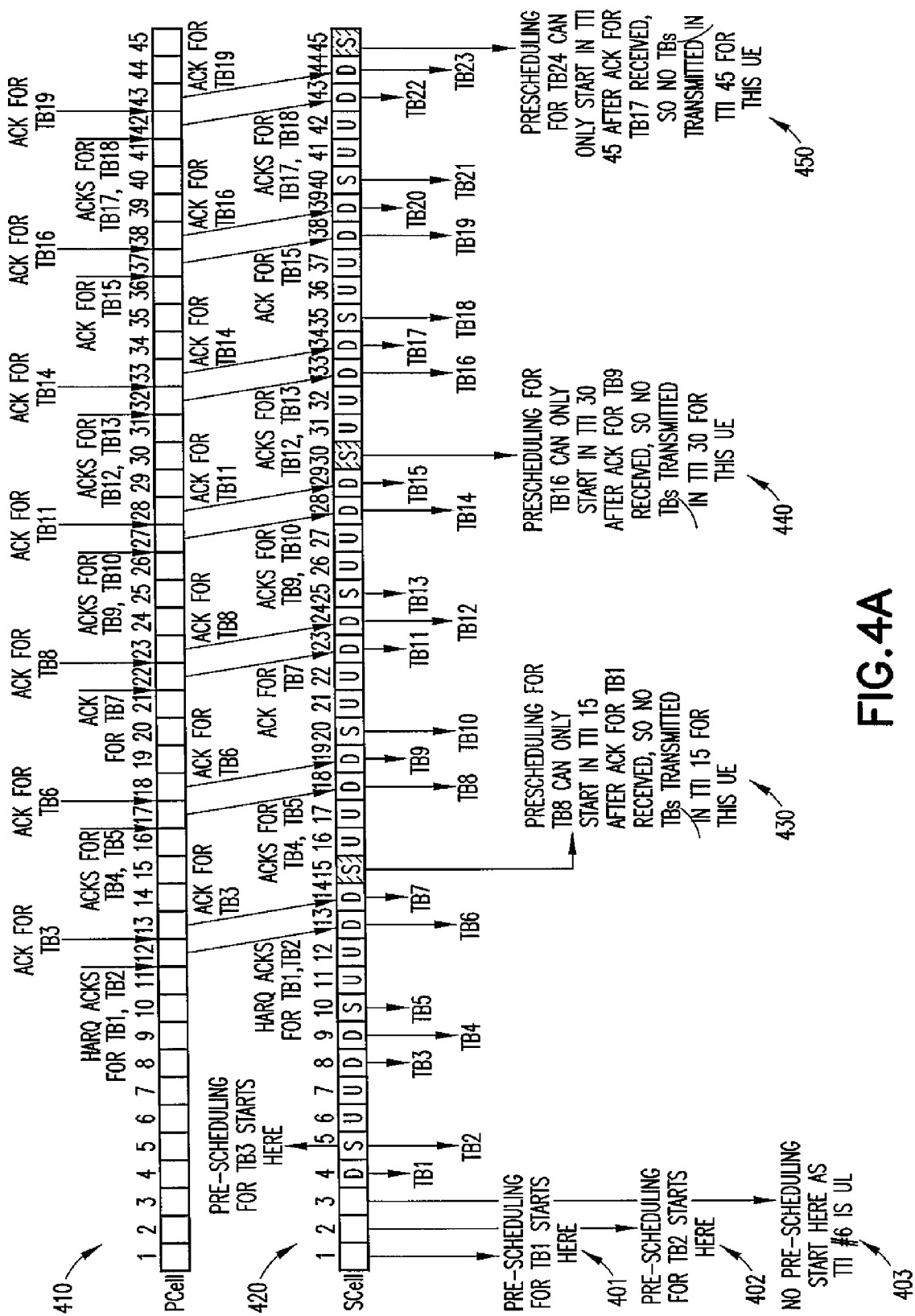
FIG. 4A illustrates inter-eNB CA SCell DL data transmission (TDD Frame Configuration 1, 7 DL HARQ Processes, $T_{x2}$=1 ms) with 1 of 9 TTIs unused.
Figure 4B:
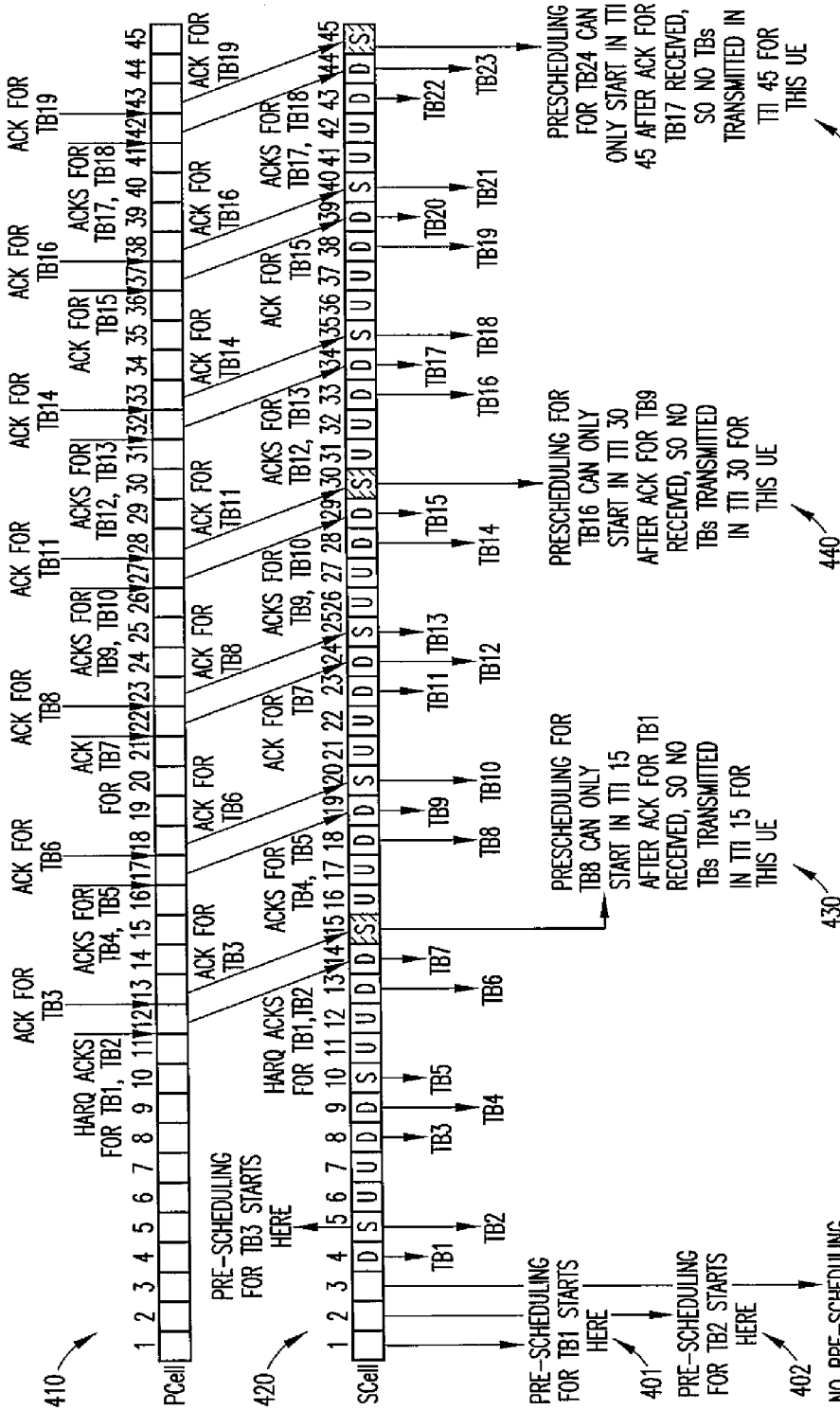
FIG. 4B illustrates inter-eNB CA SCell DL data transmission (TDD Frame Configuration 1, 7 DL HARQ Processes, $T_{x2}$=2 ms) with 1 of 9 TTIs unused.
Figure 4C:
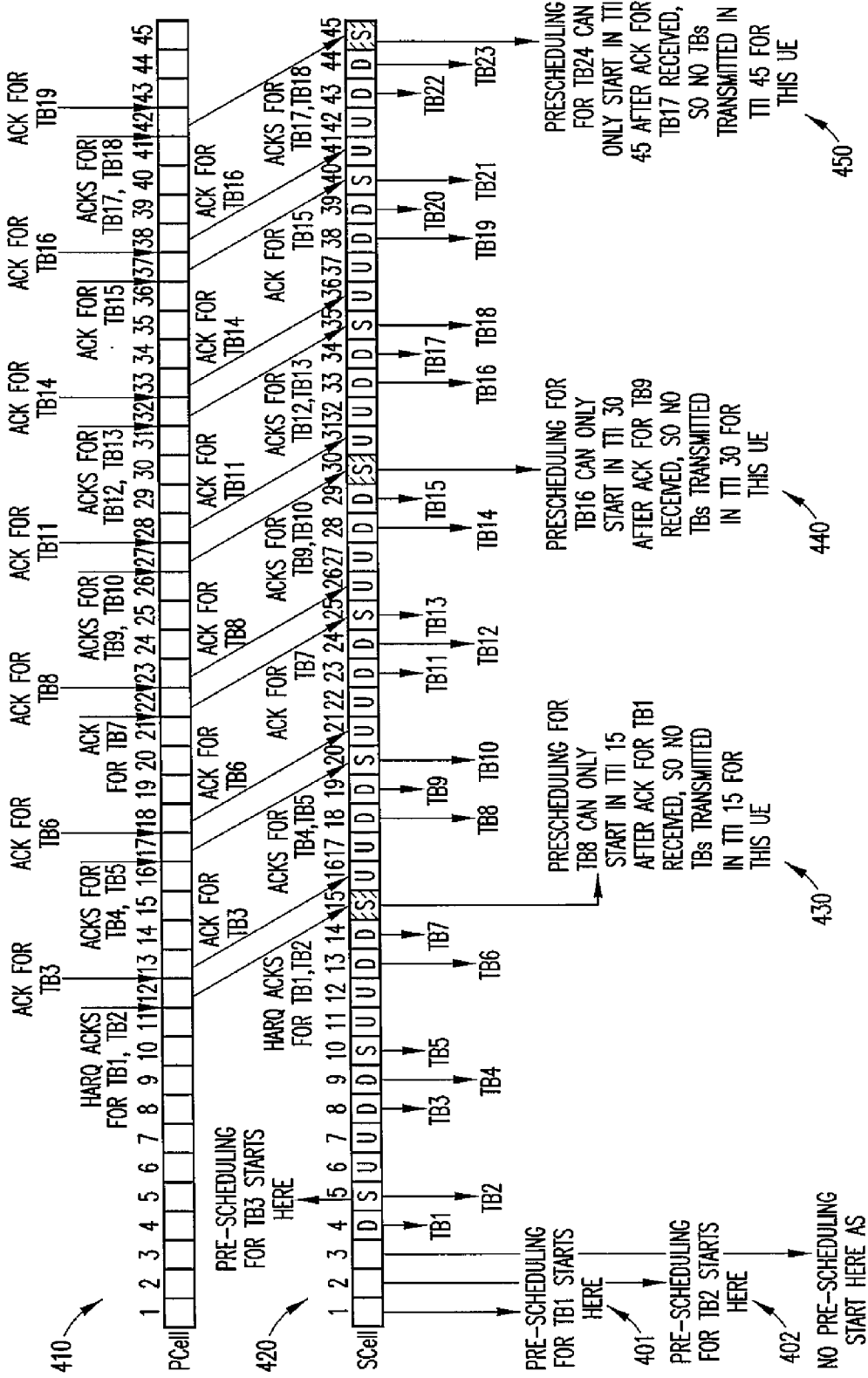
FIG. 4C illustrates inter-eNB CA SCell DL data transmission (TDD Frame Configuration 1, 7 DL HARQ Processes, $T_{x2}$=3 ms) with 1 of 9 TTIs unused.
Figure 4D:
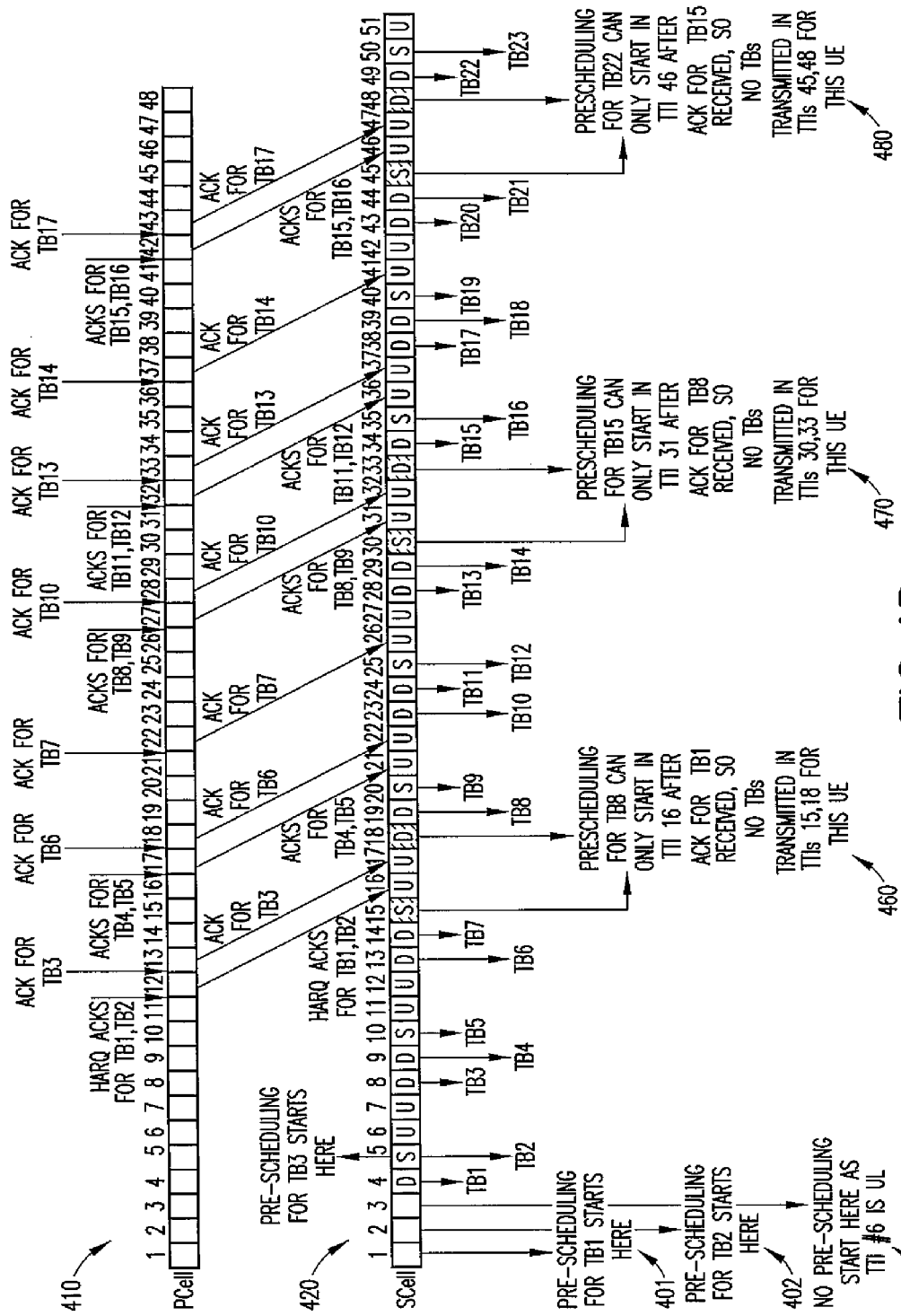
FIG. 4D illustrates inter-eNB CA SCell DL data transmission (TDD Frame Configuration 1, 7 DL HARQ Processes, $T_{x2}$=4 ms) with 2 of 9 TTIs unused.

FIGS. 4A through 4D show scenarios for inter-eNB CA SCell DL data transmission for TDD-TDD (both PCell and SCell are TDD) using TDD frame configuration 1. These figures illustrate the following: FIG. 4A illustrates inter-eNB CA SCell DL data transmission (TDD Frame Configuration 1, 7 DL HARQ Processes, $T_{x2}$=1 ms) with 1 of 9 TTIs unused; FIG. 4B illustrates inter-eNB CA SCell DL data transmission (TDD Frame Configuration 1, 7 DL HARQ Processes, $T_{x2}$=2 ms) with 1 of 9 TTIs unused; FIG. 4C illustrates inter-eNB CA SCell DL data transmission (TDD Frame Configuration 1, 7 DL HARQ Processes, $T_{x2}$=3 ms) with 1 of 9 TTIs unused; and FIG. 4D illustrates inter-eNB CA SCell DL data transmission (TDD Frame Configuration 1, 7 DL HARQ Processes, $T_{x2}$=4 ms) with 2 of 9 TTIs unused.

The TTIs 410 for PCell and the TTIs 420 for SCell are shown. Reference 401 indicates that pre-scheduling for TB1 starts in TTI 1; reference 402 indicates that pre-scheduling for TB2 starts in TTI 2; and reference 403 indicates that no pre-scheduling starts in TTI 3, as TTI #6 is UL. Reference 430 indicates that pre-scheduling for TB8 can only start in TTI 15 after an ACK for TB1 is received, so no TBs are transmitted in TTI 15 for this UE. Reference 440 indicates that pre-scheduling for TB16 can only start in TTI 30 after an ACK for TB9 is received, so no TBs are transmitted in TTI 30 for this UE. Reference 450 indicates that pre-scheduling for TB24 can only start in TTI 45 after an ACK for TB17 is received, so no TBs are transmitted in TTI 45 for this UE. References 430, 440, and 440 are for FIGS. 4A, 4B, and 4C. For FIG. 4D, references 460, 470, and 480 are shown instead. Reference 460 indicates pre-scheduling for TB8 can only start in TTI 16 after an ACK for TB1 is received, so no TBs are transmitted in TTIs 15, 18 for this UE. Reference 470 indicates that pre-scheduling for TB15 can only start in TTI 31 after an ACK for TB8 is received, so no TBs are transmitted in TTIs 30, 33 for this UE. Reference 480 indicates that pre-scheduling for TB22 can only start in TTI 46 after an ACK for TB15 is received, so no TBs are transmitted in TTIs 45, 48 for this UE.

For TDD frame configuration 1, there are seven HARQ processes for DL. A maximum of seven TBs can be sent after which a HARQ ACK must be received before the eighth TB can be pre-scheduled.

In TDD frame configuration 1, a 10 ms frame has the configuration D/S/U/U/D/D/S/U/U/D where D is a downlink subframe, U is an uplink subframe and S is a special subframe. The special subframe can also be used for downlink transmission; however a re-transmission for a TB transmission in an S subframe also occurs in an S subframe.

As not all TTIs in a TDD frame are used for DL, the gaps in the frame where DL data is not sent can negate the HARQ ACK/NACK forwarding delay to some extent. Due to this reason, the throughput efficiency for TDD is typically better than that of FDD for the same value of T. For example, for $T_{x2}$=2 ms, from FIG. 4B, one of nine TTIs is unused, amounting to 89 percent efficiency while the efficiency is 80 percent with FDD. Indeed, even for $T_{x2}$=3 ms, from FIG. 4C, only one of nine TTIs is unused. Even with $T_{x2}$=4 ms, from FIG. 4D, throughput efficiency=78 percent.

The values of MaxRBsForUE for TDD Frame Configuration 1, expressed as a fraction, for different values of $T_{x2}$ are given below in Table 2, which illustrates MaxRBsForUE, maximum theoretical percentage of RBs for a UE (TDD Frame Configuration 1).

| | $T_{x2}$ (ms) | | | |
|---|---|---|---|---|
| | 1 | 2 | 3 | 4 |
| MaxRBsForUE | 0.89 | 0.89 | 0.89 | 0.78 |

Section 2.2.3. TDD-TDD Frame Configuration 5

TDD Frame Configuration 5 has a configuration that has only one UL subframe in its 10 ms frame. Thus, the frame has the configuration D/S/U/D/D/D/D/D/D/D. Such a frame configuration is useful for an operator who has TDD spectrum and wants to use CA for DL only. Thus, this frame configuration is useful for operators requesting Supplemental Downlink.

Figure 5A:
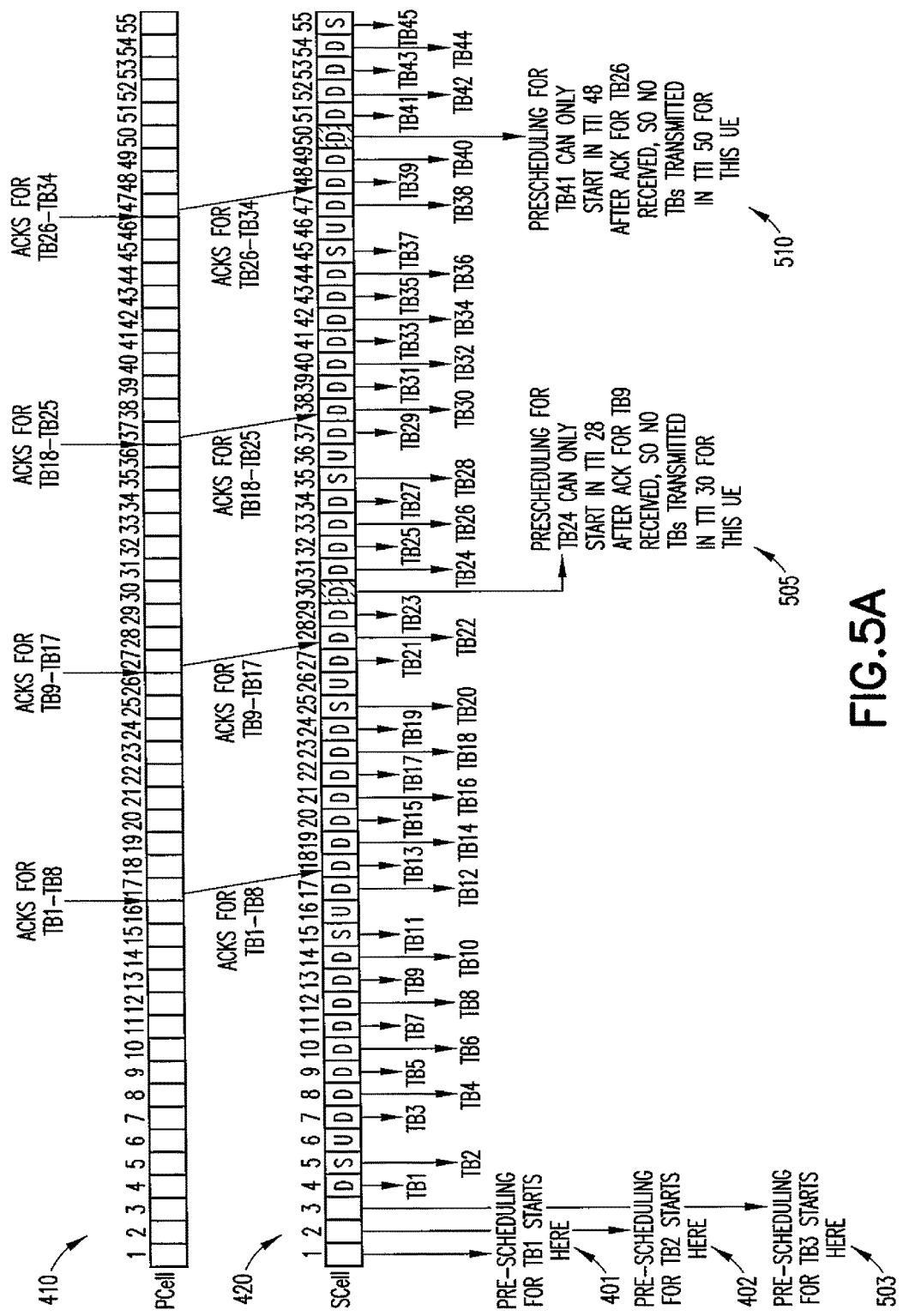
FIG. 5A illustrates inter-eNB CA SCell DL data transmission (TDD Frame Configuration 5, 15 DL HARQ Processes, $T_{x2}$=1 ms) with 1 of 18 TTIs unused.
Figure 5B:
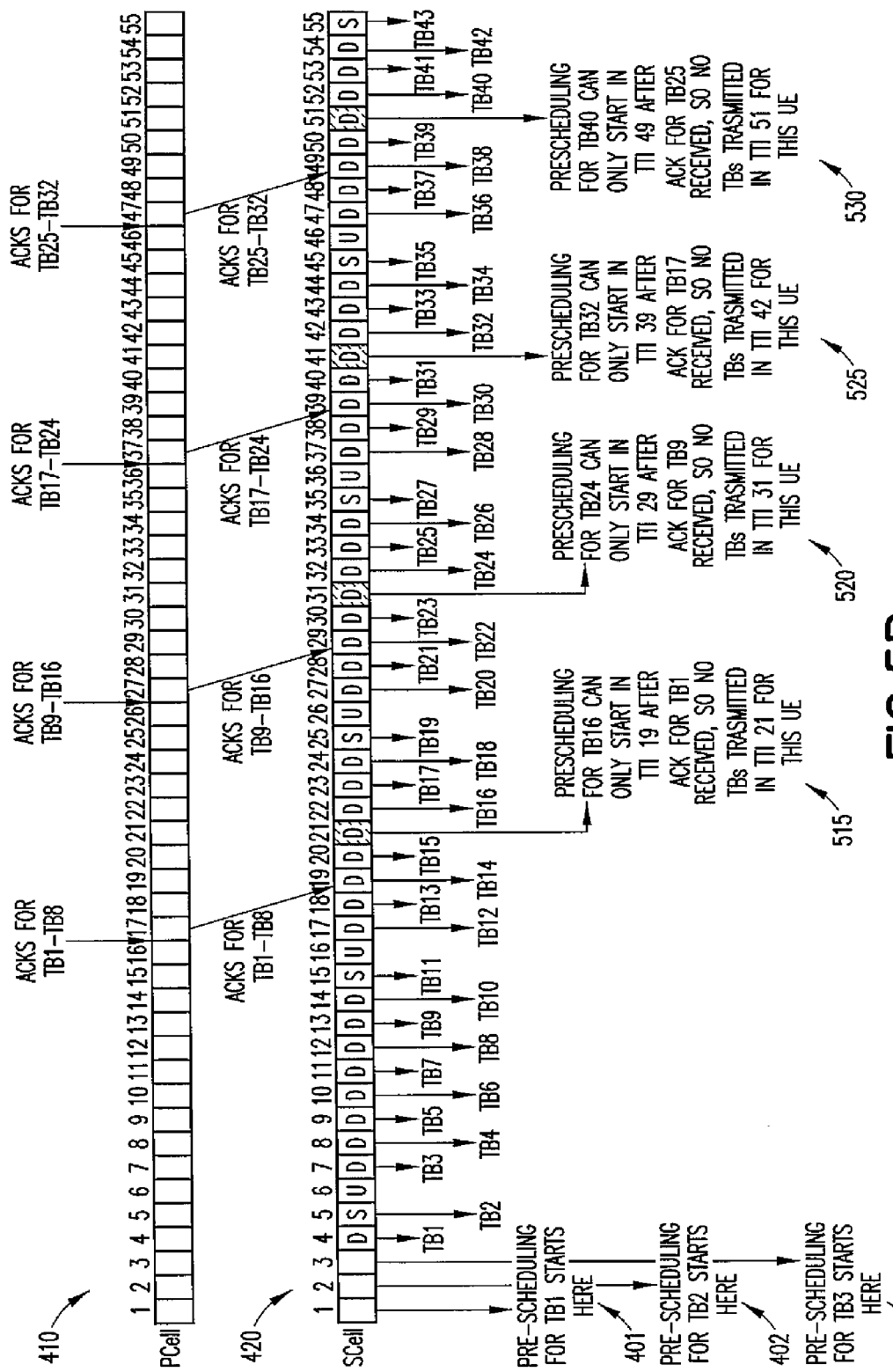
FIG. 5B illustrates inter-eNB CA SCell DL data transmission (TDD Frame Configuration 5, 15 DL HARQ Processes, $T_{x2}$=2 ms) with 1 of 9 TTIs unused.
Figure 5C:
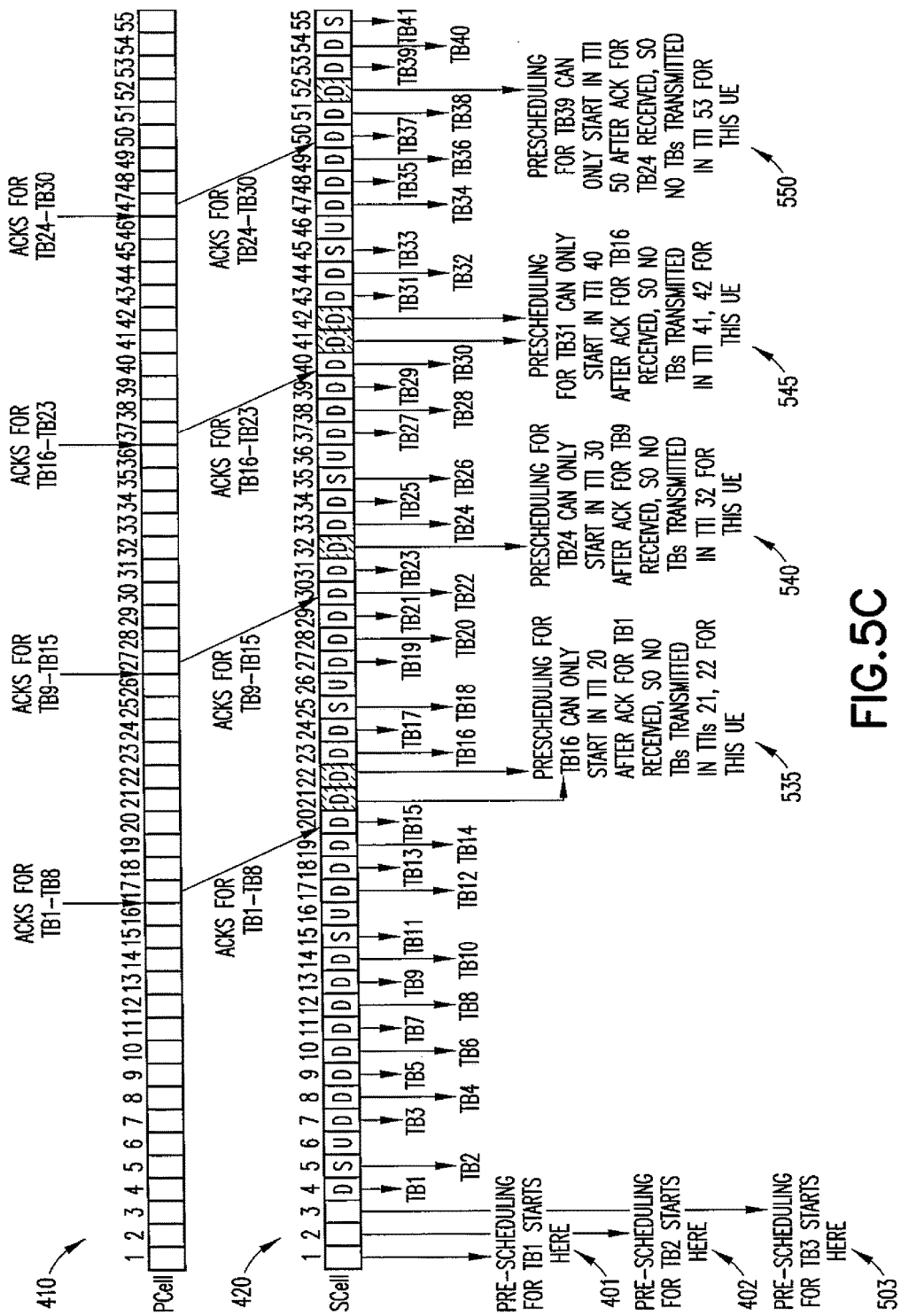
FIG. 5C illustrates inter-eNB CA SCell DL data transmission (TDD Frame Configuration 5, 15 DL HARQ Processes, $T_{x2}$=3 ms) with 3 of 18 TTIs unused.
Figure 5D:
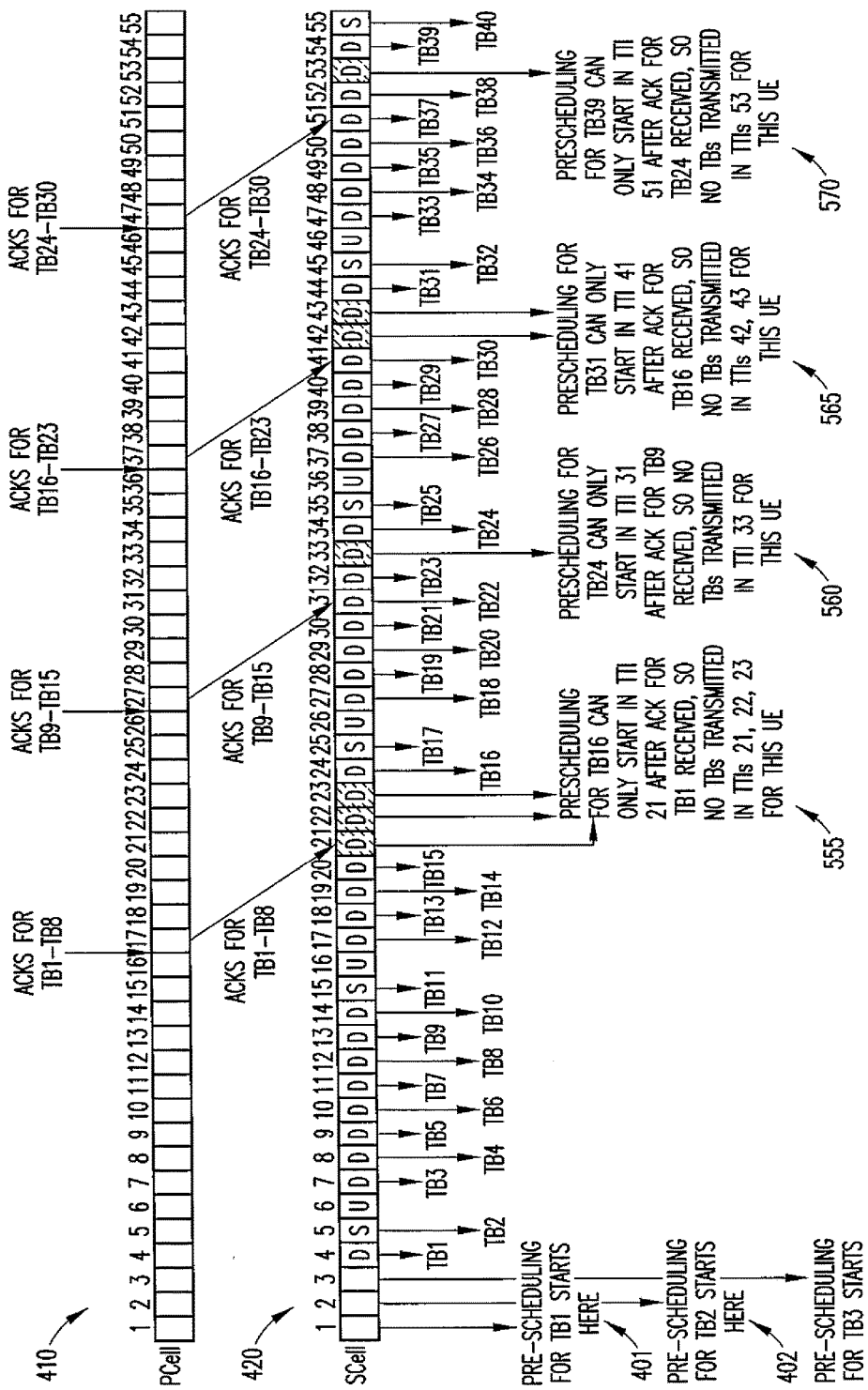
FIG. 5D illustrates inter-eNB CA SCell DL data transmission (TDD Frame Configuration 5, 15 DL HARQ Processes, $T_{x2}$=4 ms) with 3 of 18 TTIs unused.

FIGS. 5A through 5D show scenarios of inter-eNB CA SCell DL data transmission for TDD-TDD (both PCell and SCell are TDD) using TDD frame configuration 5. These figures illustrate the following: FIG. 5A illustrates inter-eNB CA SCell DL data transmission (TDD Frame Configuration 5, 15 DL HARQ Processes, $T_{x2}$=1 ms) with 1 of 18 TTIs unused; FIG. 5B illustrates inter-eNB CA SCell DL data transmission (TDD Frame Configuration 5, 15 DL HARQ Processes, $T_{x2}$=2 ms) with 1 of 9 TTIs unused; FIG. 5C illustrates inter-eNB CA SCell DL data transmission (TDD Frame Configuration 5, 15 DL HARQ Processes, $T_{x2}$=3 ms) with 3 of 18 TTIs unused; and FIG. 5D illustrates inter-eNB CA SCell DL data transmission (TDD Frame Configuration 5, 15 DL HARQ Processes, $T_{x2}$=4 ms) with 3 of 18 TTIs unused.

In FIG. 5A, reference 503 indicates that pre-scheduling for TB3 starts in TTI 3. In FIG. 5A, reference 505 indicates pre-scheduling for TB24 can only start in TTI 28 after an ACK for TB9 is received, so no TBs are transmitted in TTI 30 for this UE; reference 510 indicates pre-scheduling for TB41 can only start in TTI 48 after an ACK for TB26 is received, so no TBs are transmitted in TTI 50 for this UE. In FIG. 5B, reference 515 indicates pre-scheduling for TB16 can only start in TTI 19 after an ACK for TB1 is received, so no TBs are transmitted in TTI 21 for this UE; reference 520 indicates pre-scheduling for TB24 can only start in TTI 29 after an ACK for TB9 is received, so no TBs are transmitted in TTI 31 for this UE; reference 525 indicates pre-scheduling for TB32 can only start in TTI 39 after an ACK for TB17 is received, so no TBs are transmitted in TTI 42 for this UE; reference 530 indicates pre-scheduling for TB40 can only start in TTI 49 after an ACK for TB25 is received, so no TBs are transmitted in TTI 51 for this UE. In FIG. 5C, reference 535 indicates pre-scheduling for TB16 can only start in TTI 20 after an ACK for TB1 is received, so no TBs are transmitted in TTIs 21, 22 for this UE; reference 540 indicates pre-scheduling for TB24 can only start in TTI 30 after an ACK for TB9 is received, so no TBs are transmitted in TTI 32 for this UE; reference 545 indicates pre-scheduling for TB31 can only start in TTI 40 after an ACK for TB16 is received, so no TBs are transmitted in TTIs 41, 42 for this UE; reference 550 indicates pre-scheduling for TB39 can only start in TTI 50 after an ACK for TB24 is received, so no TBs are transmitted in TTI 52 for this UE. In FIG. 5D, reference 555 indicates pre-scheduling for TB16 can only start in TTI 21 after an ACK for TB1 is received, so no TBs are transmitted in TTIs 21, 22, 23 for this UE; reference 560 indicates pre-scheduling for TB24 can only start in TTI 31 after an ACK for TB9 is received, so no TBs are transmitted in TTI 33 for this UE; reference 565 indicates pre-scheduling for TB31 can only start in TTI 41 after an ACK for TB16 is received, so no TBs are transmitted in TTIs 42, 43 for this UE; and reference 570 indicates pre-scheduling for TB39 can only start in TTI 51 after an ACK for TB24 is received, so no TBs are transmitted in TTI 53 for this UE.

For TDD frame configuration 5, there are 15 HARQ processes for DL. A maximum of 15 TBs can be sent after which a HARQ ACK must be received before the sixteenth TB can be pre-scheduled. As can be seen from FIG. 5A through 5D, TDD frame configuration 5 also provides high SCell throughput efficiency.

The values of MaxRBsForUE for TDD Frame Configuration 5, expressed as a fraction, for different values of $T_{x2}$ are given below in Table 3, which illustrates MaxRBsForUE, maximum theoretical percentage of RBs for a UE (TDD Frame Configuration 5).

|  | $T_{x2}$ (ms) | | | |
| --- | --- | --- | --- | --- |
|  | 1 | 2 | 3 | 4 |
| MaxRBsForUE | 0.94 | 0.89 | 0.83 | 0.83 |

Section 2.3. Examples of Calculation for $t_{drain}$ and $D_{request}$
Section 2.3.1. Lightly Loaded SCell
Assume that the SCell is lightly loaded with a few GBR non-CA users amounting to a loading level $L_f$=0.1. The current MCS coding rate is 16 QAM. Let $T_{x2}$=2 ms. $T_{margin}$=1.5 ms is used. Thus, the threshold at which new data is requested from PCell=2*2+1.5=5.5 ms, i.e., if queued data can drain in less than 5.5 ms.

Let BufLen=284000 bits; assume β=0.9, 20 MHz, FDD. Assume target buffering delay of 10 ms. Additionally, assume the following:
BitsperRB=4 bits/symbol*160 resource elements/RB=640 bits/RB;
TotalRBs=100 for 20 MHz;
MaxRBsForUE=0.8 for 2 ms $T_{x2}$. 1−$L_f$=1−0.1=0.9; min(1−$L_f$, MaxRBsForUE)=min(0.9, 0.8)=0.8; and
MaxRBs=TotalRBs*min(1−$L_f$, MaxRBsForUE) 100*0.8=80.

Then $t_{drain}$ is calculated as follows:

$$t_{drain}=(\beta*\text{BufLen})/(\text{MaxRBs}*\text{BitsperRB})= (0.9*284000)/(80*640)=5 \text{ ms}.$$

As $t_{drain} < T_{margin}$, a request to get more data will be sent to PCell. Then $D_{request}$ is calculated as follows:

$$D_{request}=(\text{BufLen}/t_{drain})*(T+2*T_{x2}-t_{drain}), \text{ such that}$$
$$D_{request}=(284000/5)*(10+2*2-5)=511200 \text{ bits}=63900 \text{ bytes}.$$

Assuming an AMD PDU size (e.g., data field) of 3000 bytes, 63900/3000=22 AMD PDUs of 3000 byte size will be requested from the PCell.

Section 2.3.2. Heavily Loaded SCell
Assume that the SCell is heavily loaded with many GSR and non-GBR users amounting to a loading level $L_f$=0.9. The current MCS coding rate is 64 QAM. Let $T_{x2}$=3 ms. $T_{margin}$=1.5 ms is used. Thus, the threshold at which new data is requested from PCell=2*3+1.5=7.5 ms.

Let BufLen=74700 bits; assume β=0.9, 20 MHz, TDD frame configuration 1. Assume target buffering delay of 10 ms. Assume the following:
BitsperRB=6 bits/symbol*160 resource elements/RB=960 bits/RB;
TotalRBs=100;
MaxRBsForUE=0.89 for 3 ms $T_{x2}$. 1−$L_f$=1−0.9=0.1; min(1−$L_f$, MaxRBsForUE)=min(0.1, 0.89)=0.1; and
MaxRBs=TotalRBs*min(1−$L_f$, MaxRBsForUE)= 100*0.1=10.

Calculate $t_{drain}$ as follows:

$$t_{drain}(\beta*\text{BufLen})/(\text{MaxRBs}*\text{BitsperRB})=(0.9*74700)/ (10*960)=7 \text{ ms}.$$

As $t_{drain} < T_{margin}$, a request to get more data will be sent to PCell. Calculate $D_{request}$ as follows:

$$D_{request}=(\text{BufLen}/t_{drain})*(T+2*T_{x2}-t_{drain}), \text{ such that}$$
$$D_{request}=(74700/7)*(10+2*3-7)=96043 \text{ bits}=12005 \text{ bytes}.$$

Assuming an AMD PDU size (e.g., data field) of 3000 bytes, 12005/3000=5 AMD PDUs of 3000 byte size will be requested from the PCell.

Figure 6:
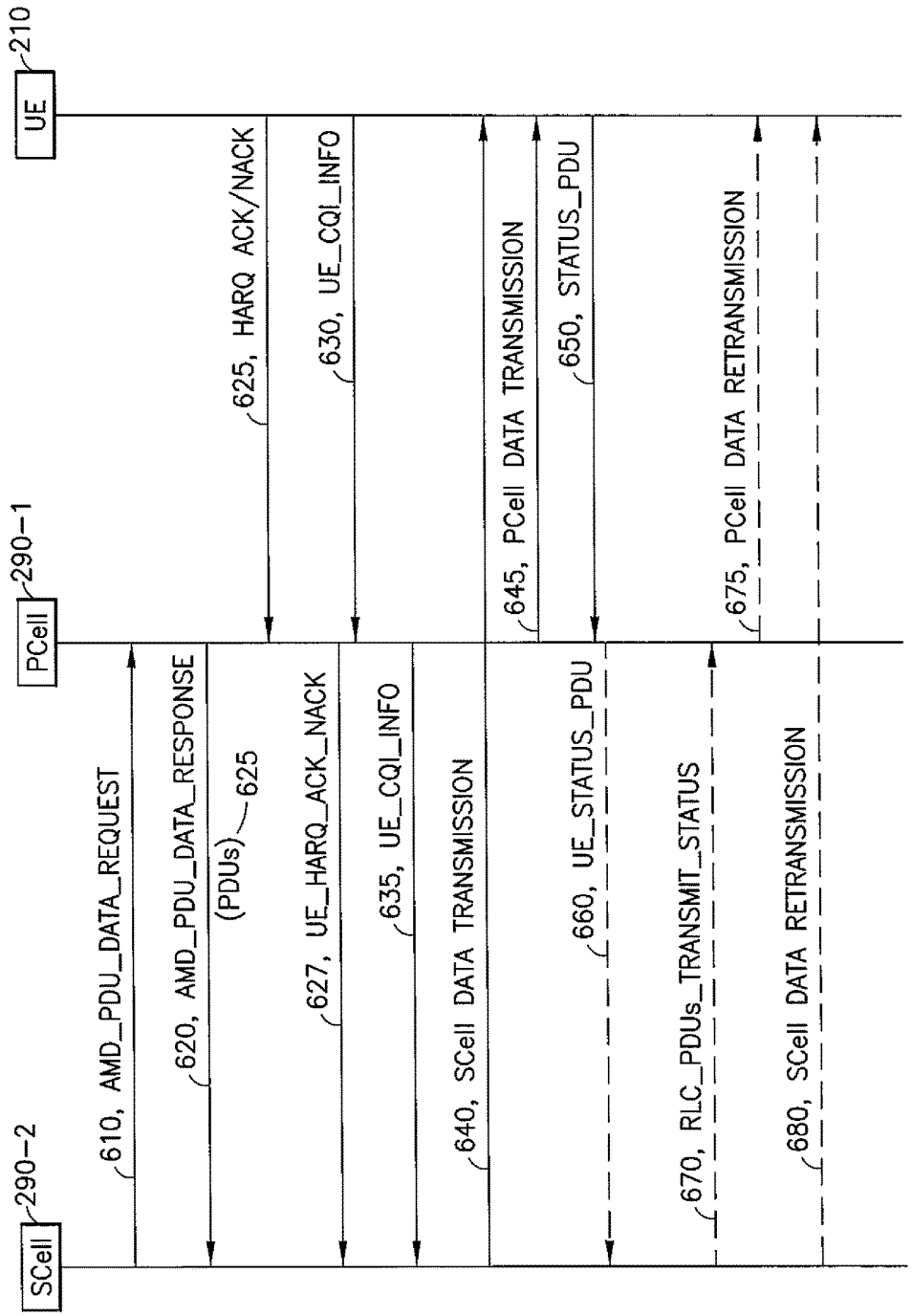
FIG. 6 is a signaling diagram showing example messages communicated between elements for inter-eNB carrier aggregation.

Section 2.4. Other Messages Useful for Flow Control
Turning to FIG. 6, this figure is a signaling diagram showing example messages communicated between elements for inter-eNB carrier aggregation. In this example, the SCell 290-2 performs a data transmission 640 to the UE 210, and the PCell 290-1 also performs a data transmission 645 to the UE 210. Both the SCell 290-2 and the PCell 290-1 may perform retransmission of PDUs that were not received by the UE 210, as indicated by references 680 and 675, respectively. The following messages used in flow control have already been discussed:

1) AMD_PDU_DATA_REQUEST: This message 610 is sent from SCell to PCell for requesting PCell to send AMD PDUs.

2) AMD_PDU_DATA_RESPONSE: This message 620 contains the AMD PDU(s) 625 and is sent from PCell to SCell. There may be multiple messages 620, each containing different AMD PDU(s) 625.

In addition, the following messages may be useful for flow control:

3) UE_HARQ_ACK_NACK: This message is used for HARQ ACK/NACK 625 received from the UE and forwarded (as message 627) from PCell to SCell.

4) UE_CQI_INFO: This message 630 is used for CQI information received from the UE and forwarded (message 635) from PCell to SCell and is used to select the MCS for a drain rate calculation.

5) UE_STATUS_PDU: This message 660 is the subset of the STATUS_PDU message 650 received from the UE, and the message 660 is forwarded from PCell to SCell for handling ARQ retransmissions. In one embodiment, the subset of STATUS PDU (that is, the UE_STATUS_PDU message 660) has ARQ ACK/NACK information only for the PDUs that were sent to SCell.

6) RLC_PDUs_TRANSMIT_STATUS: This message 670 is sent (e.g., periodically) from the SCell to PCell providing the list of PDUs and PDU segments transmitted successfully and list of PDUs/PDU segments not yet sent. This message may be sent periodically. This message is an alternate message to UE_STATUS_PDU. If this message is sent, PCell may not send the UE_STATUS_PDU.

It is noted that the names of the messages herein are merely examples and may be different in implementation.

Section 3. Handling of AMD PDU Loss Across X2 Link

The AMD PDUs may be sent over the X2 link 270 using an unreliable protocol such as the GTP-U protocol. As the protocol is unreliable, some AMD PDUs may be lost over the link. Even if the SCell requested N PDUs from the PCell, the PCell may send a smaller number of PDUs based on its own loading factor, amount of data currently queued for the UE, and the like. Thus, the SCell has no way of knowing if AMD PDUs were actually lost over the link.

FIG. 7 shows the RLC STATUS PDU. The STATUS PDU may contain multiple NACK_SNs (which indicate the SNs of AMD PDUs that have been detected as lost) for PDUs or PDU segments for which the NACKs are applicable and also the segment offsets (SOs) corresponding to the PDU segments for which the NACKs are applicable. This will include NACKs for PDUs/PDU segments sent both by the PCell and SCell. If PCell were to forward the entire STATUS PDU to the SCell, the SCell may not be able to differentiate whether some of the NACKs are for PDUs that were sent by PCell to SCell and were lost across the X2 link 270.

To alleviate this problem, the PCell may send in the UE_STATUS_PDU the ARQ ACK/NACKs for only those AMD PDUs (identified by the RLC sequence numbers, SNs) which were sent to the SCell for transmission. If the SCell received an ARQ NACK for an AMD PDU which was not received by the SCell, the SCell will inform the PCell so that PCell can re-transmit to the UE that AMD PDU by itself. If the SCell received an ARQ NACK for an AMD PDU (or a segment of the PDU) which was received by the SCell, SCell will re-transmit the PDU or the PDU segment to the UE. The PCell will buffer all AMD PDUs sent to the SCell until ARQ ACKs are received for the same in the STATUS PDU. The PDUs can be released once the ACKs are received.

As an alternate solution, the SCell may periodically send the RLC_PDUs_TRANSMIT_STATUS to PCell. This message will contain the list of PDUs transmitted successfully and a list of PDUs not yet sent by the SCell. When PCell receives the STATUS PDU from the UE, the PCell can correlate the STATUS PDU and the latest RLC_PDUs_TRANSMIT_STATUS messages and determine if some AMD PDUs were lost on the link (e.g., X2). Also, with this alternate solution, PCell may not send the UE_STATUS_PDU to SCell. Instead, the PCell may handle the ARQ re-transmission of AMD PDUs/PDU segments transmitted by the SCell also. As the STATUS PDU has segment offset information, PCell has all the information to construct the AMD PDU segments transmitted by the SCell.

Section 4. Handling of Queued Data at the SCell when SCell is Deactivated

When SCell receives a deactivation request, e.g., from the PCell for the UE, the SCell will simply discard the remaining queued data and process the deactivation. However, the SCell could have segmented AMD PDUs and transmitted the segment(s). SCell may send the RLC_PDUs_TRANSMIT_STATUS message to PCell with the latest transmission status. PCell can use this message to determine which AMD PDUs/PDU segments the PCell needs to transmit for the first time or re-transmit. Even if the SCell did not send this message, the PCell can wait till the STATUS PDU is received from the UE and then determine which AMD PDUs that were sent to SCell need to be re-transmitted or initially transmitted.

Turning to FIG. 8, this figure is a block diagram of an exemplary logic flow diagram for inter-eNB carrier aggregation. This figure also illustrates the operation of an exemplary method, a result of execution of computer program instructions embodied on a computer readable memory, and/or functions performed by logic implemented in hardware, in accordance with exemplary embodiments herein. The blocks in this figure may further be considered to be interconnected means for performing the functions in the blocks. Depending on the scenario, the blocks in FIG. 8 may be performed by the PCell eNB 290-1 or the SCell eNB 290-2.

In block 810, in a communication system where a primary cell is controlled by a first base station and a secondary cell is controlled by a second, different base station, flow control is performed between the primary cell and the secondary cell for data for a radio link control layer. In block 820, according to the flow control, the data for the radio link control layer is communicated between the first and second base stations using a link between the first and second base stations.

The following are additional examples. Example 1. A method, comprising: in a communication system where a primary cell is controlled by a first base station and a secondary cell is controlled by a second, different base station, performing flow control between the primary cell and the secondary cell for data for a radio link control layer; and communicating, according to the flow control, the data for the radio link control layer between the first and second base stations using a link between the first and second base stations.

Example 2. The method of example 1, wherein performing flow control between the primary cell and the secondary cell comprises dynamically controlling a depth of queued radio link control data in the secondary cell for one or more user equipment based on one or more factors. Example 3. The method of example 2, wherein the performing flow control is performed at the secondary cell. Example 4. The method of example 2, wherein the performing flow control is performed at the primary cell.

Example 5. The method of any of examples 2 to 4, wherein the one or more factors comprise current loading of the secondary cell, or projected future loading of the secondary cell, or a combination of current loading and projected future loading. Example 6. The method of any of examples 2 to 5, wherein the one or more factors comprise peak theoretical throughput for a user equipment in the secondary cell. Example 7. The method of any of examples 2 to 6, wherein the one or more factors comprise a user equipment's current channel quality information. Example 8. The method of any of examples 2 to 7, wherein the one or more factors comprise an amount of data currently queued for a user equipment.

Example 9. The method of any one of examples 1 to 8, wherein the secondary cell estimates a time lag between an original packet data unit request sent over the link and a corresponding response message received over the link, the response message comprising a packet data unit, and wherein the measured time lag is an estimate of round trip time. Example 10. The method of example 9, wherein the secondary cell estimates an approximate length of time that queued data for the radio link control layer will last for a certain user equipment. Example 11. The method of example 10, wherein the approximate length of time is determined using the following:

$$t_{drain} = \frac{\beta * BufLen}{MaxRBs * BitsPerRB},$$

where MaxRBs=TotalRBs*min $((1-L_f), (MaxRBsforUE))$, $t_{drain}$ is the approximate length of time, $\beta$ is coefficient set to a value to account for conditions when throughput of the certain user equipment could be improving, BufLen is an amount of data for the radio link control layer queued for the certain user equipment in bits, TotalRBs is a total number of downlink resource blocks in a carrier used by the secondary cell, $L_f$ is a projected future loading level for the carrier, and MaxRBsforUE=maximum theoretical percentage of resource blocks that the certain user equipment could be assigned as a rolling average in this carrier.

Example 12. The method of any of examples 10 or 11, further comprising the secondary cell comparing the determined approximate length of time to a threshold that is a certain margin greater than the estimated round trip time, and sending a request for additional data for the radio link control layer based on the determined approximate length of time being less than or equal to the threshold. Example 13. The method of example 12, wherein the request comprises information indicating an amount of data requested and the method further comprises determining the amount of data requested based on the amount of data for the radio link control layer queued for the certain user equipment in bits, the approximate length of time that queued data for the radio link control layer will last for the certain user equipment, a target buffering delay at the secondary cell, and the round trip time.

Example 14. The method of example 13, wherein determining the amount of data requested is performed using the following: $D_{request}=(BufLen/t_{drain})*(T+2*T_{x2}-t_{drain})$, wherein $D_{request}$ is the determined amount of data requested, T is the target buffering delay, and $T_{x2}$ is a latency on the link between the primary and secondary base stations and is determined using the round trip time.

Example 15. The method of any of examples 1 to 14, further comprising the primary cell sending to the secondary cell a message comprising information indicating which packet data units were received by a user equipment, and wherein the primary cell limits the information to those packet data units previously sent from the primary cell to the secondary cell. Example 16. The method of example 15, wherein the information comprises automatic repeat request acknowledgement/negative acknowledgement information corresponding to the packet data units. Example 17. The method of any of examples 15 to 16, further comprising the primary cell buffering packed data units that have been sent from the primary cell to the secondary cell until acknowledgement/negative acknowledgement information has been received from the secondary cell indicating corresponding ones of the packet data units have been received by the secondary cell.

Example 18. The method of any of examples 1 to 14, further comprising the secondary cell sending a message to the primary cell indicating a list of packet data units transmitted by the secondary cell.

Example 19. The method of any of examples 1 to 14, further comprising the primary cell receiving a message from the secondary cell indicating a list of packet data units transmitted by the secondary cell, the primary cell using the list to determine which packet data units were not received by the secondary cell, and the primary cell retransmitting the packet data units that were not received by the secondary cell.

Example 20. The method of any of examples 1 to 19, further comprising the secondary cell receiving a deactivation request for a certain user equipment, discarding remaining queued data for the radio link control layer for the certain user equipment, and processing the deactivation. Example 21. The method of example 20, further comprising the secondary cell sending a latest transmission status that determines which packet data units have been sent by the secondary cell and which packet data units have not been sent by the secondary cell.

Example 22. The method of any of examples 1 to 19, further comprising the primary cell sending a deactivation request to the secondary cell and subsequently receiving information indicating which packet data units were sent by the secondary cell to a certain user equipment and re-transmitting packet data units not sent by the secondary cell to the certain user equipment.

Example 23. The method of any of examples 1 to 19, further comprising the primary cell sending a deactivation request to the secondary cell and subsequently receiving information indicating which packet data units received by a certain user equipment and re-transmitting to the certain user equipment packet data units not received by the certain user equipment.

Example 24. The method of any of examples 1 to 23, wherein communicating further comprises send from the secondary cell to the primary cell a message for requesting the primary cell to send acknowledge mode data packet data units. Example 25. The method of any of examples 24, wherein the message is an AMD_PDU_DATA_REQUEST message.

Example 26. The method of any of examples 1 to 24, wherein communicating further comprises sending from the primary cell to the secondary cell a message comprising acknowledge mode data packet data units. Example 26. The method of any of examples 1 to 25, wherein communicating further comprises sending from the primary cell to the secondary cell a message comprising hybrid automatic repeat request acknowledgement/negative acknowledgement information received from a user equipment. Example 27. The method of any of examples 1 to 26, wherein communicating further comprises sending from the primary cell to the secondary cell a message comprising channel quality information received from a user equipment. Example 28. The method of any of examples 1 to 27, wherein communicating further comprises sending from the primary cell to the secondary cell a message comprising hybrid automatic repeat request acknowledgement/negative acknowledgement information only for packet data units that were sent from the primary cell to the secondary cell for the certain user equipment. Example 29. The method of any of examples 1 to 27, wherein communicating further comprises periodically sending from the secondary cell to the primary cell a message providing a list of packet data units and packet data unit segments transmitted successfully and a list of packet data units and packet data unit segments not yet sent by the secondary cell.

Example 30. An apparatus comprising means for performing any of the methods of examples 1 to 29.

Example 31. An apparatus comprising: one or more memories comprising computer program code; and one or more processors, wherein the one or more memories and the computer program code are configured, with the one or more processors, to cause the apparatus to perform any of the methods of examples 1 to 29.

Example 32. A computer program product comprising a computer readable storage medium having instructions for use by an apparatus, the instructions comprising computer program code for causing the apparatus to perform any of the methods of examples 1 to 29.

Embodiments (or portions thereof) of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., memory(ies) 225, 255 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

Acronyms used in this application or the drawings are defined as follows.
3GPP Third Generation Partnership Project
ACK Acknowledge
AMD Acknowledge Mode (AM) Data
ARQ Automatic Repeat reQuest
CA Carrier Aggregation
CC Component Carrier
CQI Channel Quality Information
DL downlink (from base station to UE)
eNB evolved NodeB, an LTE base station controlling access to a wireless network
E-UTRAN Evolved-UTRAN
FDD Frequency Division Duplex
GBR Guaranteed Bit Rate
GPRS General Packet Radio Service
GTP GPRS Tunneling Protocol
GTP-U GTP-User plane
HARQ Hybrid Automatic Repeat reQuest
IP Internet Protocol
L1 Layer 1 (Physical layers)
L2 Layer 2
LTE Long Term Evolution
MAC Medium Access Control
Mbps MegaBits Per Second
MCS Modulation and Coding Scheme
MHz mega-Hertz
ms milliseconds
NACK Negative Acknowledge
PCC Primary Component Carrier
PCell Primary serving Cell
PDCP Packet Data Convergence Protocol
PDU Protocol Data Unit
PHY Physical (layer)
PUCCH Physical Uplink Control CHannel
PUSCH Physical Uplink Shared CHannel
QAM Quadrature Amplitude Modulation
QPSK Quadrature Phase Shift Keying
RB Resource Block
Rel Release
RLC Radio Link Control
RRC Radio Resource Control
RTT Round Trip Time
Rx reception or receiver
SCC Secondary Component Carrier
SCell Secondary serving cell
SDU Service Data Unit
SeNB Secondary eNB
SN Sequence Number
SO Segment Offset
TB Transport Block
TDD Time Division Duplex
TTI Transmission Time Interval
Tx transmission or transmitter
UDP User Datagram Protocol
UE User Equipment, e.g., a wireless device accessing a wireless network
UL uplink (from UE to base station)
UTRAN Universal Terrestrial Radio Access Network

The invention claimed is:
1. An apparatus, comprising:
at least one processor; and
at least one memory including computer program code, the at least one memory and the computer program code configured, with the at least one processor, to cause the apparatus to perform at least the following:

performing, in a communication system where a primary cell is controlled by a first base station and a secondary cell is controlled by a second, different base station, flow control between the primary cell and the secondary cell for data for a radio link control layer, the data being radio link control packet data units;

communicating, according to the flow control, the data for the radio link control layer between the first and second base stations using a link between the first and second base stations, wherein the data are communicated between a radio link control layer on the primary cell and a radio link control layer on the secondary cell;

estimating by the secondary cell a time lag between an original packet data unit request sent over the link and a corresponding response message received over the link, the response message comprising a packet data unit, and wherein the measured time lag is an estimate of round trip time;

estimating by the secondary cell an approximate length of time that queued data for the radio link control layer will last for a certain user equipment;

comparing by the secondary cell the determined approximate length of time to a threshold that is a certain margin greater than the estimated round trip time; and sending a request for additional data for the radio link control layer based on the determined approximate length of time being less than or equal to the threshold.

2. The apparatus of claim 1, wherein performing flow control between the primary cell and the secondary cell comprises dynamically controlling a depth of queued radio link control data in the secondary cell for one or more user equipment based on one or more factors.

3. The apparatus of claim 2, wherein the one or more factors comprise one of the following or multiples ones of the following in combination: current loading of the secondary cell; projected future loading of the secondary cell; peak theoretical throughput for a user equipment in the secondary cell; a user equipment's current channel quality information; or an amount of data currently queued for a user equipment.

4. The apparatus of claim 1, wherein the approximate length of time is determined using the following:

$$t_{drain} = \frac{\beta * BufLen}{MaxRBs * BitsPerRB},$$

where MaxRBs=TotalRBs*min((1−$L_f$), (MaxRBsforUE)), $t_{drain}$ is the approximate length of time, β is coefficient set to a value to account for conditions when throughput of the certain user equipment could be improving, BufLen is an amount of data for the radio link control layer queued for the certain user equipment in bits, TotalRBs is a total number of downlink resource blocks in a carrier used by the secondary cell, $L_f$ is a projected future loading level for the carrier, and MaxRBsforUE =maximum theoretical percentage of resource blocks that the certain user equipment could be assigned as a rolling average in this carrier.

5. The apparatus of claim 1, wherein the request comprises information indicating an amount of data requested and the at least one memory and the computer program code are further configured, with the at least one processor, to cause the apparatus to perform at least the following: determining the amount of data requested based on the amount of data for the radio link control layer queued for the certain user equipment in bits, the approximate length of time that queued data for the radio link control layer will last for the certain user equipment, a target buffering delay at the secondary cell, and the round trip time.

6. The apparatus of claim 5, wherein determining the amount of data requested is performed using the following: $D_{request}=(BufLen/t_{drain})*(T+2*T_{X2}-t_{drain})$ wherein $D_{request}$ is the determined amount of data requested, T is the target buffering delay, and $T_{X2}$, is a latency on the link between the primary and secondary base stations and is determined using the round trip time.

7. The apparatus of claim 1, wherein the at least one memory and the computer program code are further configured, with the at least one processor, to cause the apparatus to perform at least the following: receiving by the secondary cell a deactivation request for a certain user equipment, discarding remaining queued data for the radio link control layer for the certain user equipment, and processing the deactivation.

8. The apparatus of claim 1, wherein the at least one memory and the computer program code are further configured, with the at least one processor, to cause the apparatus to perform at least the following: sending from the primary cell a deactivation request to the secondary cell, subsequently receiving information indicating which packet data units were received by a certain user equipment, and re-transmitting to the certain user equipment packet data units not received by the certain user equipment.

9. The apparatus of claim 1, wherein communicating further comprises sending from the secondary cell to the primary cell a message for requesting the primary cell to send acknowledge mode data packet data units.

10. The apparatus of claim 1, wherein communicating further comprises sending from the primary cell to the secondary cell a message comprising acknowledge mode data packet data units.

11. The apparatus of claim 1, wherein communicating further comprises sending from the primary cell to the secondary cell a message comprising hybrid automatic repeat request acknowledgement/negative acknowledgement information received from a user equipment.

12. The apparatus of claim 1, wherein communicating further comprises sending from the primary cell to the secondary cell a message comprising channel quality information received from a user equipment.

13. The apparatus of claim 1, wherein communicating further comprises sending from the primary cell to the secondary cell a message comprising hybrid automatic repeat request acknowledgement/negative acknowledgement information only for packet data units that were sent from the primary cell to the secondary cell for the certain user equipment.

14. A computer program product comprising a non-transitory computer-readable storage medium bearing computer program code embodied therein for use with a computer, the computer program code causing the computer to perform, in response to execution of the computer program code, operations performing the method of claim 1.

15. A method, comprising:

performing, in a communication system where a primary cell is controlled by a first base station and a secondary cell is controlled by a second, different base station, flow control between the primary cell and the secondary cell for data for a radio link control layer, the data being radio link control packet data units; and communicating, according to the flow control, the data for the radio link control layer between the first and second base stations using a link between the first and second base stations, wherein the data are communicated between a radio link control layer on the primary cell and a radio link control layer on the secondary cell;

estimating by the secondary cell a time lag between an original packet data unit request sent over the link and a corresponding response message received over the link, the response message comprising a packet data unit, and wherein the measured time lag is an estimate of round trip time;

estimating by the secondary cell an approximate length of time that queued data for the radio link control layer will last for a certain user equipment;

comparing by the secondary cell the determined approximate length of time to a threshold that is a certain margin greater than the estimated round trip time; and sending a request for additional data for the radio link control layer based on the determined approximate length of time being less than or equal to the threshold.

16. The method of claim 15, wherein performing flow control between the primary cell and the secondary cell comprises dynamically controlling a depth of queued radio link control data in the secondary cell for one or more user equipment based on one or more factors.

17. The method of claim 16, wherein the one or more factors comprise one of the following or multiple ones of the following in combination: current loading of the secondary cell; projected future loading of the secondary cell; peak theoretical throughput for a user equipment in the secondary cell; a user equipment's current channel quality information; or an amount of data currently queued for a user equipment.

18. An apparatus, comprising:
at least one processor; and
at least one memory including computer program code, the at least one memory and the computer program code configured, with the at least one processor, to cause the apparatus to perform at least the following:

performing, in a communication system where a primary cell is controlled by a first base station and a secondary cell is controlled by a second, different base station, flow control between the primary cell and the secondary cell for data for a radio link control layer, the data being radio link control packet data units;

communicating, according to the flow control, the data for the radio link control layer between the first and second base stations using a link between the first and second base stations, wherein the data are communicated between a radio link control layer on the primary cell and a radio link control layer on the secondary cell, wherein communicating further comprises sending from the primary cell to the secondary cell a message comprising hybrid automatic repeat request acknowledgement/negative acknowledgement information only for packet data units that were sent from the primary cell to the secondary cell for the certain user equipment.

19. A method, comprising:
performing, in a communication system where a primary cell is controlled by a first base station and a secondary cell is controlled by a second, different base station, flow control between the primary cell and the secondary cell for data for a radio link control layer, the data being radio link control packet data units; and communicating, according to the flow control, the data for the radio link control layer between the first and second base stations using a link between the first and second base stations, wherein the data are communicated between a radio link control layer on the primary cell and a radio link control layer on the secondary cell, wherein communicating further comprises sending from the primary cell to the secondary cell a message comprising hybrid automatic repeat request acknowledgement/negative acknowledgement information only for packet data units that were sent from the primary cell to the secondary cell for the certain user equipment.

\* \* \* \* \*